US012113295B2

(12) United States Patent
Zeeshan et al.

(10) Patent No.: US 12,113,295 B2
(45) Date of Patent: Oct. 8, 2024

(54) FLEXIBLE MULTI-BEAM, MULTI FREQUENCY, WIDEBAND RF AND DIGITAL TRANSCEIVER ARCHITECTURE FOR MODULAR METASURFACE ANTENNA

(71) Applicant: Kymeta Corporation, Redmond, WA (US)

(72) Inventors: Zeeshan Zeeshan, Seattle, WA (US); Mohsen Sazegar, Kirkland, WA (US); Maxwell A. Smoot, Seattle, WA (US); Chris Eylander, Redmond, WA (US); Joseph Taylor, Redmond, WA (US); Nick McCarty, Redmond, WA (US)

(73) Assignee: KYMETA CORPORATION, Redmond, WA (US)

( * ) Notice: Subject to any disclaimer, the term of this patent is extended or adjusted under 35 U.S.C. 154(b) by 188 days.

(21) Appl. No.: 18/072,971

(22) Filed: Dec. 1, 2022

(65) Prior Publication Data

US 2023/0187824 A1 Jun. 15, 2023

Related U.S. Application Data

(60) Provisional application No. 63/285,582, filed on Dec. 3, 2021.

(51) Int. Cl.
*H01Q 3/26* (2006.01)
*H01Q 15/00* (2006.01)
*H01Q 21/06* (2006.01)

(52) U.S. Cl.
CPC ....... *H01Q 3/2682* (2013.01); *H01Q 15/0086* (2013.01); *H01Q 21/065* (2013.01)

(58) Field of Classification Search
CPC ............... H01Q 3/2605; H01Q 3/2682; H01Q 15/0006; H01Q 15/0086; H01Q 21/002;
(Continued)

(56) References Cited

U.S. PATENT DOCUMENTS 6,701,141 B2 3/2004 Lam
9,812,786 B2 11/2017 Foo
(Continued)

OTHER PUBLICATIONS

International Preliminary Report on Patentability received for PCT Patent Application No. PCT/US2022/051662, mailed on Jun. 13, 2024, 6 pages.
(Continued)

*Primary Examiner* — Jason M Crawford
(74) *Attorney, Agent, or Firm* — Womble Bond Dickinson (US) LLP

(57) ABSTRACT

An antenna transceiver architecture for a modular metasurface antenna and method for using the same are disclosed. In some embodiments, the antenna architecture includes a plurality of metasurface antenna tiles, where each metasurface antenna tile of the plurality of metasurface antenna tiles having one or more feed ports individually fed when in operation to support one or more independent beams, and wherein the plurality of metasurface antenna tiles comprise a plurality of sub-arrays of metasurface antenna tiles. In some embodiments, the antenna architecture also includes a plurality of digital back ends (DBEs) coupled to the plurality of metasurface antenna tiles, where each DBE is operable to: adjust time delays of one or more of received signals arriving from metasurface antenna tiles of the one sub-array of metasurface antenna tiles as part of time delay beamforming and combine the received signals in a digital domain to produce one or more beamformed signals, and delay transmit signals fed to the plurality of tiles in the digital domain by adjusting time delays of one or more of the transmit signals as part of time delay beamforming.

20 Claims, 14 Drawing Sheets

(58) Field of Classification Search
CPC . H01Q 21/0025; H01Q 21/061; H01Q 21/065
See application file for complete search history.

(56) References Cited

U.S. PATENT DOCUMENTS

| | | | |
|---|---|---|---|
| 2015/0255868 A1 | 9/2015 | Haddad et al. | |
| 2018/0269576 A1* | 9/2018 | Scarborough | H01Q 21/0025 |
| 2018/0351250 A1* | 12/2018 | Achour | H01Q 21/064 |
| 2019/0097299 A1* | 3/2019 | Fotheringham | H01Q 1/24 |
| 2019/0237873 A1* | 8/2019 | Sazegar | H01Q 3/40 |
| 2020/0028261 A1* | 1/2020 | Foo | H01Q 3/36 |
| 2020/0144719 A1* | 5/2020 | Scarborough | H01Q 1/288 |
| 2021/0258069 A1* | 8/2021 | Sazegar | H04B 7/084 |
| 2023/0187824 A1* | 6/2023 | Zeeshan | H01Q 21/0025 |
| | | | 343/702 |

OTHER PUBLICATIONS

International Search Report and Written Opinion received for PCT Patent Application No. PCT/US22/51662, mailed on Apr. 24, 2023, 7 pages.

* cited by examiner

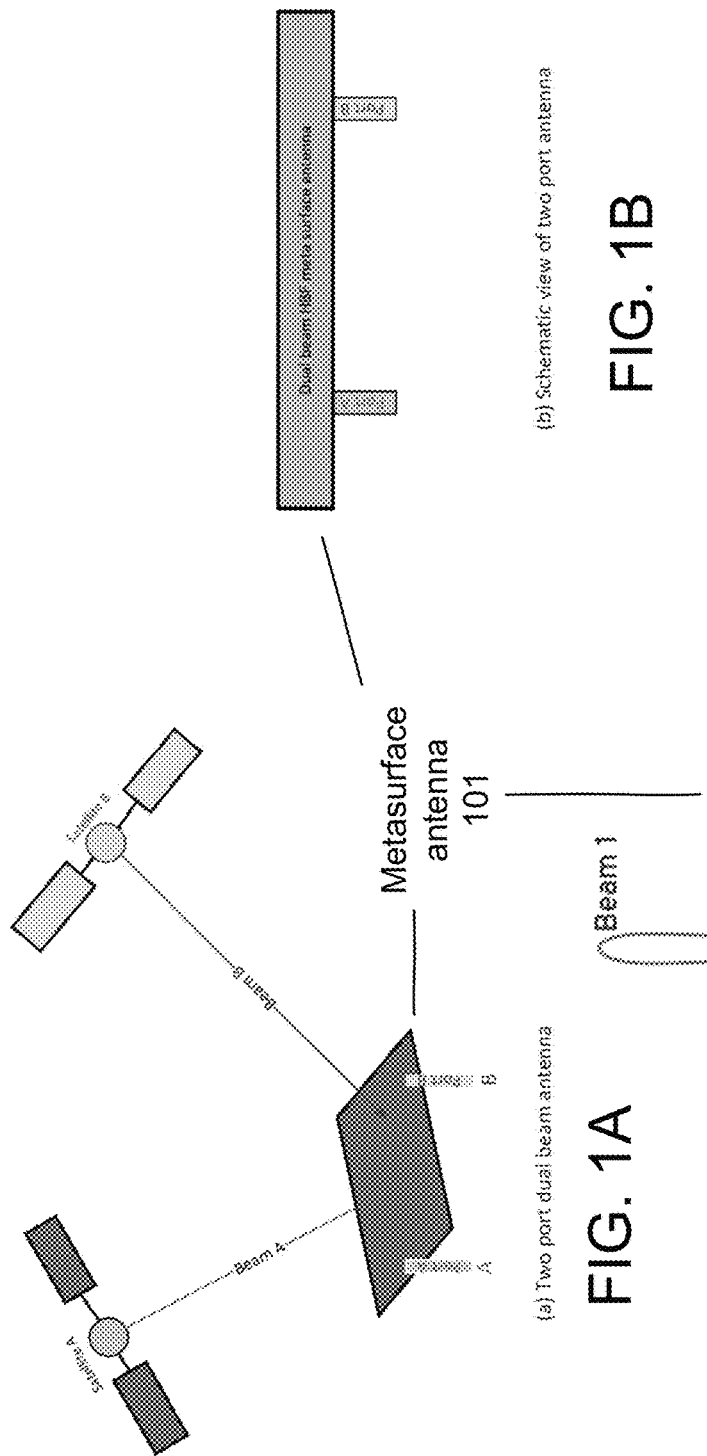
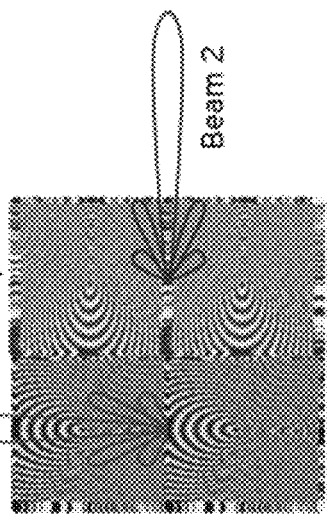
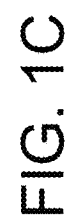
FIG. 1A
(a) Two port dual beam antenna
FIG. 1B
(b) Schematic view of two port antenna
FIG. 1C
(c) Dual beam metasurface antenna, indicating pattern generation that produces two beams

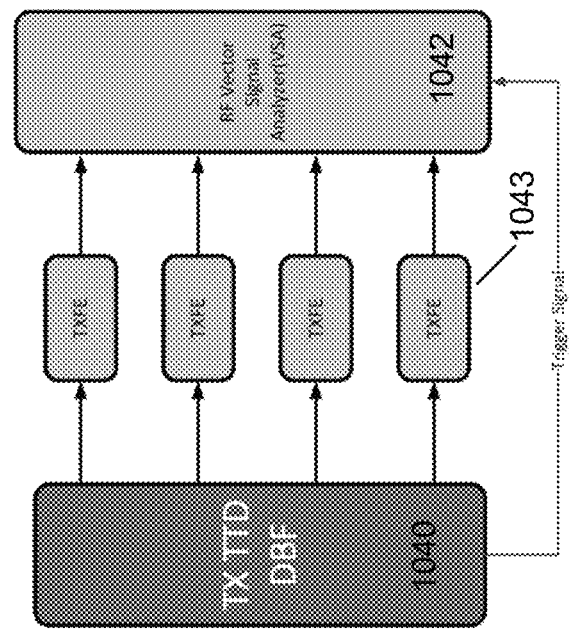
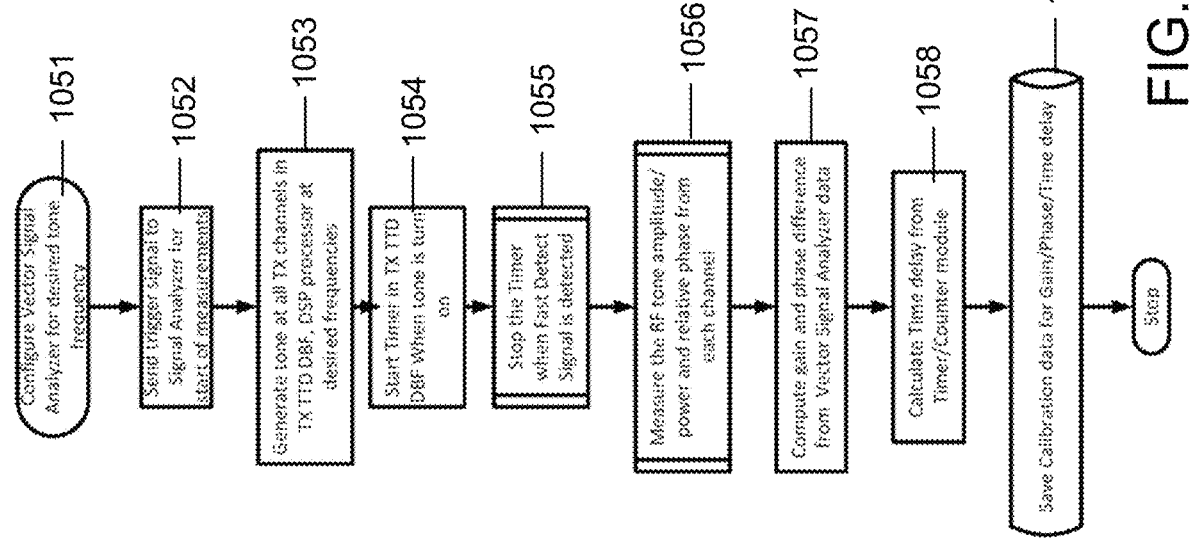
FIG. 10F
FIG. 10E

FLEXIBLE MULTI-BEAM, MULTI FREQUENCY, WIDEBAND RF AND DIGITAL TRANSCEIVER ARCHITECTURE FOR MODULAR METASURFACE ANTENNA

RELATED APPLICATION

The present application is a non-provisional application of and claims the benefit of U.S. Provisional Patent Application No. 63/285,582, filed Dec. 3, 2021, and entitled "FLEXIBLE MULTI-BEAM, MULTI FREQUENCY, WIDEBAND RF AND DIGITAL TRANSCEIVER ARCHITECTURE FOR MODULAR METASURFACE ANTENNA", which is incorporated by reference in its entirety.

FIELD OF THE INVENTION

Embodiments disclosed herein are related to wireless communication; more particularly, embodiments disclosed herein are related to antennas for wireless communication that include multiple metasurface antenna tiles and are capable of generating multiple beams simultaneously.

BACKGROUND

Metasurface antennas have recently emerged as a new technology for generating steered, directive beams from a lightweight, low-cost, and planar physical platform. Such metasurface antennas have been recently used in a number of applications, such as, for example, satellite communication.

Metasurface antennas may comprise metamaterial antenna elements that can selectively couple energy from a feed wave to produce beams that may be controlled for use in communication. These antennas are capable of achieving comparable performance to phased array antennas from an inexpensive and easy-to-manufacture hardware platform.

Some metamaterial antennas have one aperture that generates multiple beams with their RF radiating antenna elements. In such a case, the antenna creates two beams at two different frequencies and different antenna elements are used for each of the different beams. Thus, one beam is generated at one frequency with a portion of the antenna elements of an aperture while another beam is being generated at a different frequency with different antenna elements of the aperture. These technologies do not allow for the creation of two beams and channels operating at the same frequency.

Furthermore, other technologies exist that include apertures that create two beams at two different frequencies using multiple feed ports. This allows the signals to be kept isolated from each other, and they can be connected to separate sets of RF chains. However, in these cases, the aperture is used as two terminals that share the same aperture.

SUMMARY

An antenna transceiver architecture for a modular metasurface antenna and method for using the same are disclosed. In some embodiments, the antenna architecture includes a plurality of metasurface antenna tiles, where each metasurface antenna tile of the plurality of metasurface antenna tiles has one or more feed ports individually fed when in operation to support one or more independent beams, and wherein the plurality of metasurface antenna tiles comprise a plurality of sub-arrays of metasurface antenna tiles. In some embodiments, the antenna architecture also includes a plurality of digital back ends (DBEs) coupled to the plurality of metasurface antenna tiles, wherein each DBE of the plurality of DBEs is coupled to one sub-array of the plurality of sub-arrays of metasurface antenna tiles to: adjust time delays of one or more of received signals arriving from metasurface antenna tiles of the one sub-array of metasurface antenna tiles as part of time delay beamforming and combine the received signals in a digital domain to produce one or more beamformed signals, and delay transmit signals fed to the plurality of tiles in the digital domain by adjusting time delays of one or more of the transmit signals as part of time delay beamforming. The time delays applied to received and transmit signals compensate for differences in receive and transmit paths, respectively, and in feed delays for each of the plurality of metasurface antenna tiles.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIGS. 1A-C illustrate examples of a metasurface antenna (tile) having multibeam capabilities.

FIGS. 10A-10F illustrate some embodiments of calibration processes.

DETAILED DESCRIPTION

Figure 2B:
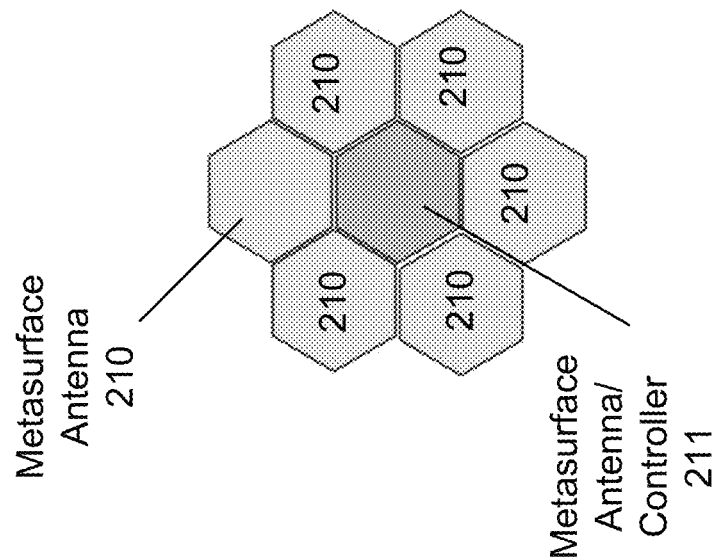
FIGS. 2A and 2B illustrate some embodiments of a multi-port, multi-beam holographic beam forming metasurface antenna array.

In the following description, numerous details are set forth to provide a more thorough explanation of the disclosed embodiments. It will be apparent, however, to one skilled in the art, that the embodiments may be practiced without these specific details. In other instances, well-known structures and devices are shown in block diagram form, rather than in detail, in order to avoid obscuring the claimed embodiments.

Embodiments disclosed herein include a multi-beam communication transmitter and receiver system. The system can be part of a user terminal in a satellite communication system. In some embodiments, the multi-beam communication transmitter and receiver system is reconfigurable and multi-frequency. In some embodiments, a system disclosed herein supports wide bandwidth communication with dynamic reconfigurability and frequency agility to meet or exceed the requirements of the next generation satellite communication terminals.

In some embodiments, the communication system includes an array of metasurface antennas. In some embodiments, this system includes one or more conventional active electronically scanned array (AESA) antenna subarrays. In some other embodiments, this system includes an array of metasurface antennas and conventional AESA antenna subarrays. In some embodiments, this system allows use of multiple smaller metasurface antennas or conventional AESA antenna subarrays, each referred to herein as a tile, that can individually support higher bandwidth at extreme scan angles, to have higher received signal-to-noise ratio (SNR) and higher transmitted effective isotropic radiated power (EIRP) without beam squinting on transmit (TX) or intersymbol interference (ISI) on receive (RX).

The use of antenna tiles can overcome the problem of beam squinting when transmitting with an electrically large metasurface antenna and intersymbol interference (ISI) for the received antenna at large scan angles, thus limiting the effective bandwidth. By forming an array of smaller metasurface antennas, each smaller antenna, or tile, can support a larger bandwidth, though each tile has a smaller gain and G/T. In some embodiments, the system disclosed herein combines the signals from each metasurface tile. In some embodiments, the signals are combined by adjusting the time delay in baseband after down converting and discretizing the signals and then adding signals in baseband coherently, thus increasing effective G/T. In some embodiments, a signal to each antenna tile is delayed before being fed to the digital-to-analog converter (DAC), with the amount of the delay corresponding to time delay required to transmit the beam at any scan direction. This enables higher gain and EIRP without having squinting problem or gain ripples.

In some embodiments, the modulator and demodulator can upconvert the signal to any desired band, and therefore operation of the system is flexible with reference to multi-frequency operation. Furthermore, since beamforming for RX is performed in the digital domain, any partition of the RX antennas tiles can be dynamically configured to produce a desired beam. Similarly, since a TX digital delay is implemented in baseband, the transmitted signal can also be dynamically configured for any scan and array configuration on the fly.

In some embodiments, the communication system is software defined and allows a communication system to be dynamically configured for any number of beams, frequencies and antenna tiles. In some embodiments, the communication system can support multiple simultaneous beams operating at diverse frequencies for wideband communication. In some embodiments, techniques disclosed herein support multibeam operation using either an array of metasurface antenna tiles with each supporting multiple beams or a different partition of single beam metasurface antenna tiles used to form dual or multiple beams. In some embodiments, the flexible antenna operation also enables multiple beams in a true time delay (TTD) mode for the metasurface antenna supporting only single beam or a tile supporting multiple feeds and beams. Thus, the system also enables multiple beams using either different partitions of metasurface antennas for each beam or using the metasurface antenna tile having multi-feed/beam capability.

In some embodiments, the communication system allows dynamic self-calibration for time delay and gain differences caused by the different radio-frequency (RF) and digital chain and differences in metasurface antenna feed delays for each of the TX/RX antenna tiles. In some embodiments, the system architecture can be calibrated easily for delay differences among different metasurface antenna. The antenna can be part of a user terminal in a satellite communication system and the calibration can occur in either factory mode (in anechoic chamber) or in field mode while in operation.

FIGS. 1A-C illustrate examples of a metasurface antenna (tile) according to an embodiment having multibeam capabilities that enable it to generate at least two beams simultaneously. In some embodiments, the tile supports two simultaneous transmit (TX) or receive (RX) beams. In some embodiments, the signals for the two beams are fed at the two ports and each port has a diplexer, to enable simultaneous TX or RX of signals. In some embodiments, the communication system supports an existing single port, single beam metasurface antenna array as well.

Referring to FIG. 1A, according to some embodiments, a two-port dual beam metasurface antenna 101 includes ports A and B to feed a feed wave to metamaterial antenna elements on metasurface antenna 101 that generate beams for communicating signals. Being fed by two ports, metasurface antenna 101 creates beams A and B to communicate with different satellites, namely satellite A and B, respectively. FIG. 1B shows a schematic view of metasurface antenna 101 according to one aspect. Referring to FIG. 1B, in some embodiments, metasurface antenna 101 comprises a two-port holographic beamforming (HBF) metasurface antenna. FIG. 1C illustrates metasurface antenna 101 generating dual beams 1 and 2. In some embodiments, beams 1 and 2 are generated using a pattern generated and applied to the metamaterial antenna elements.

Note that metasurface antennas with antenna apertures having metamaterial antenna elements, along with the generation of multiple beams simultaneously according to some embodiments are described in more detail below.

Figure 2A:
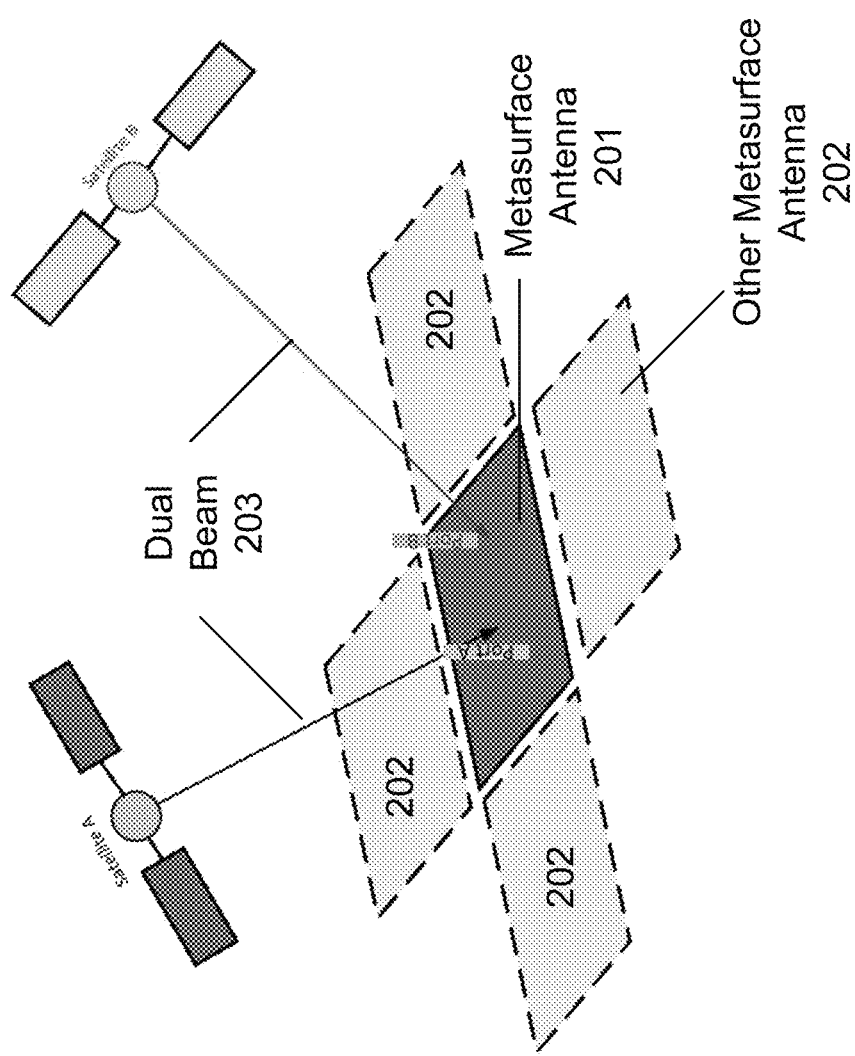

FIGS. 2A and 2B illustrate some embodiments of a multi-port, multi-beam holographic beam forming metasurface antenna array (multi-tile array). FIG. 2A illustrates the meta-surface antenna array supporting dual beam operation. Referring to FIG. 2A, metasurface antenna tile 201 is surrounded by other metasurface antennas 202 to form an array. Metasurface antenna 201 includes two feed ports, port A and port B, for feeding feed waves to metamaterial antenna elements of metasurface antenna 201 to enable the metamaterial antenna elements to generate dual beams 203 to satellites A and B.

FIG. 2B illustrates some embodiments of an array or plurality of metasurface antennas, which is some embodiments can be hexagonal in shape. Referring to FIG. 2B, in one embodiment, six metasurface antennas 210 surround a metasurface antenna 211. While there are six hexagonal metasurface antennas surrounding one hexagonal metasurface antenna, in some embodiments, there are more or less than seven total metasurface antennas and some or all can have a shape other than a hexagonal shape. Furthermore, although the shape of metasurface antenna tiles in the embodiment of FIG. 2B is hexagonal, other embodiments may include other shaped metasurface antenna tiles and/or metasurface antenna tiles having different shapes or a combination of shapes. In some embodiments, metasurface antenna 211 includes a controller (e.g., a processor, etc.) operable or configured to perform True Time Delay (TTD) beamforming for all of metasurface antennas 210 and 211.

Figure 3:
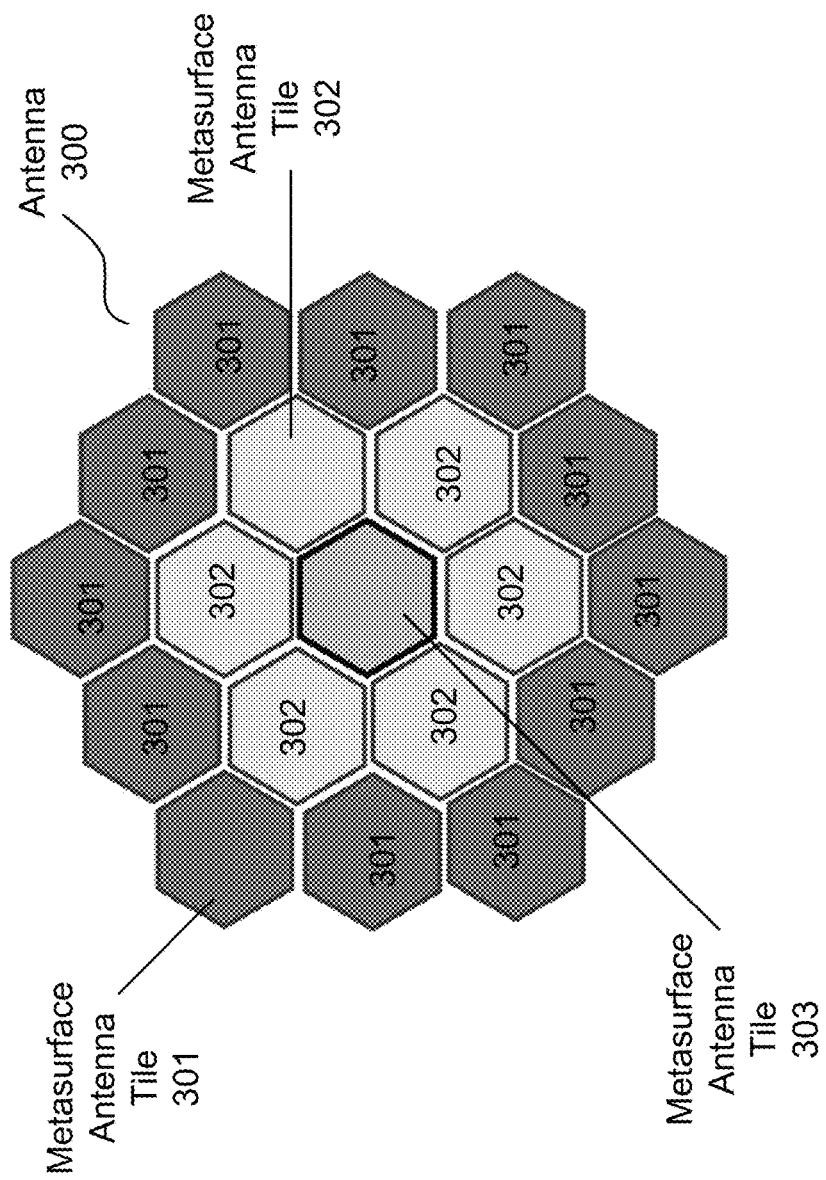
FIG. 3 illustrates some embodiments of a metasurface antenna array.

FIG. 3 illustrates some embodiments of a metasurface antenna array. In the description that follows the terms "inner" or "inside" refer to a relative position toward or proximate a central region of the metasurface antenna array, and the terms "outer" or "outside" refer to a relative position away from or distal with respect to the central region. Referring to FIG. 3, each metasurface antenna tile supports a TX/RX beam, for example a single TX/RX beam, so that a metasurface antenna array 300 can form multiple beams in operation. The multiple beams can be produced by groups of metasurface antenna tiles. In such cases, the metasurface antenna array 300 divides, or partitions, the tiles into two or more groups. In one embodiment, a first group includes outer metasurface antenna tiles 301 positioned at or around the outside or an outer region of antenna array 300 forming one partition, while a second group includes inner metasurface antenna tiles 302 positioned between the first group and a central or most inner metasurface antenna tile 303, for example adjacent or contiguous the first group on an inner side of outer metasurface antenna tiles 301. In some embodiments, the first and second groups can be concentric. In some embodiments, the first and second groups respectively generate first and second beams, so that metasurface antenna array 300 forms dual beams when in operation. In some embodiments, central or most inner metasurface antenna tile 303 includes a controller (e.g., a processor, etc.) operable or configured to perform true time delay (TTD) digital beamforming. In some embodiments, central or most inner metasurface antenna tile 303 can operate or electronically communicate with the inner metasurface antenna tiles 302 to form the second beam; additionally or alternatively, the central or most inner metasurface antenna tile 303 can operate or electronically communicate with the outer metasurface antenna tiles 301 to form the first beam. In some embodiments, more than one tile can have such a controller (e.g., every tile including a controller, etc.).

Figure 4:
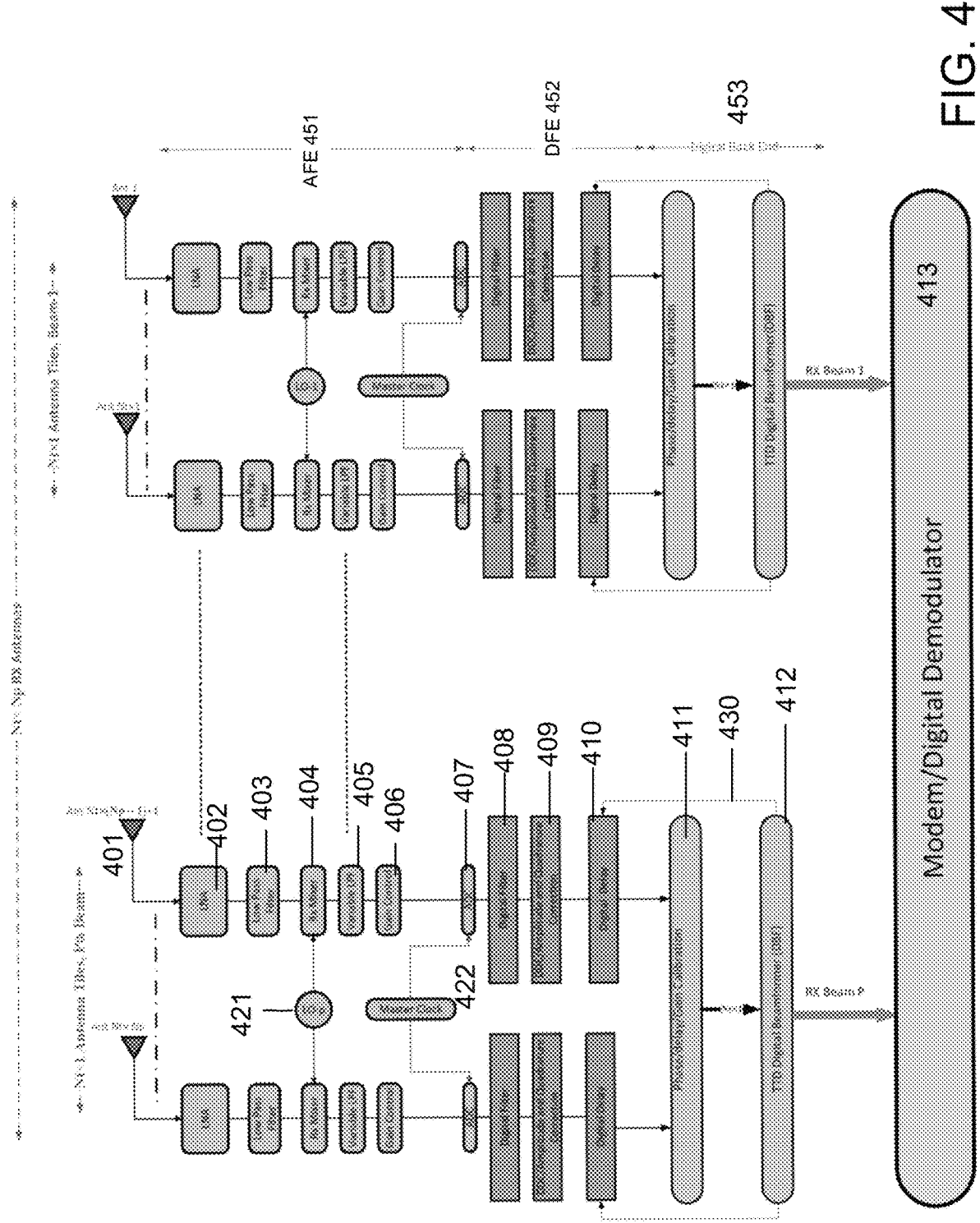
FIG. 4 illustrates some embodiments of a receiver system architecture having an RX metasurface antenna array comprising $N_t$ tiles where each tile has P ports.

FIG. 4 illustrates some embodiments of a receiver system architecture having an RX metasurface antenna array comprising quantity $N_t$ tiles and each tile has quantity P ports, thereby supporting P independent beams, where $N_t$ and P are integers. Referring to FIG. 4, the receiver system architecture comprises metasurface antenna tiles being combined to produce a beamformed signal using time delay beamforming in digital baseband. For example, Ntx1 antenna tiles create beam 1, using antenna 1 through antenna Ntx1; Ntx1 antenna tiles create beam 2, using antenna (NtxN2-1) through antenna NtxN2, . . . , and Ntx1 antenna tiles create beam P using antenna (NtxNp-1) through antenna NtxNp. Each antenna is coupled to a modem/digital demodulator via a receive path.

In some embodiments, each receive path comprises a low-noise amplifier (LNA) (e.g., LNA 402) with an input coupled to the antenna (e.g., antenna 401). The output of the LNA (e.g., LNA 402) is coupled to an input of a low pass filter (LPF) (e.g., LPF 403). The output of the low pass filter is coupled to an Rx frequency mixer (e.g., Rx mixer 404), which mixes the incoming signal from the LPF with the signal from a local oscillator (LO) (e.g., LO 421). The output of the Rx mixer is received at the input of a variable LPF (e.g., LPF 405). The output of the LPF is received by an input of a gain control block (e.g., gain control block 406), which controls the gain of the received signal after LPF filtering. The output of the gain control block is coupled to an input of an analog-to-digital converter (ADC) (e.g., ADC 407), which receives clocking from a master clock (e.g., master clock 422). In some embodiments, the gain control block adjusts the signal level to get it into the dynamic range of the ADC. In some embodiments, the gain control block comprises a variable gain amplifier. The ADC converts the analog received signal to digital format. The components from the LNA to the ADC are considered part of the analog front-end (AFE) 451 of the receive path.

The digital output of the ADC is input to a digital filter (e.g., digital filter 408) that filters the digital data representing a received signal. The filtered digital data is sent to a DDC and amplitude and quadrature correction block (e.g., DDC/Amplitude and quadrature correction block 409) that performs digital down conversion and amplitude and quadrature correction. After performing these operations, the digital output is input to a digital delay block (e.g., digital delay block 410) that adds a digital delay to the received signal. In some embodiments, the digital delay block operates based on a feedback signal from a True Time Delay (TTD) digital beamformer 412 that is part of a digital backend (DBE) 453. In some embodiments, the delay applied by the digital delay block 409 is determined from a calibration process that compensates for the different delays associated with the receiver front end (RXFE) (e.g., AFE 451 and digital front end (DFE) 452 of each receive path of a tile). The components from the digital filter to digital delay block 409 are considered part of the digital front-end (DFE) 452 of the receive path.

Figure 8:
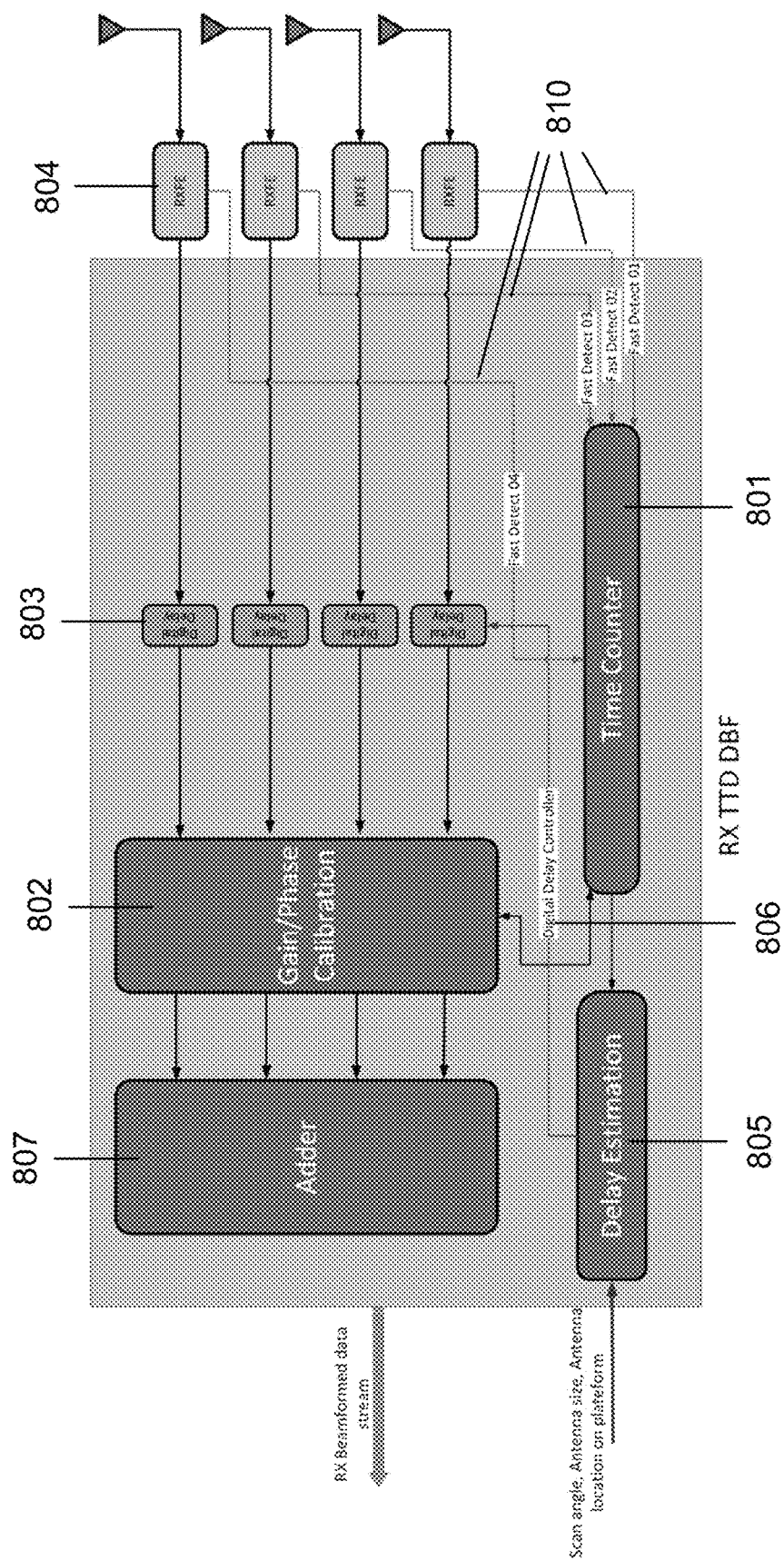
FIG. 8 is a block diagram of some embodiments of a RX true time delay beamforming (RX TTD DBF).

DBE 453 performs RX time domain beamforming digitally. In some embodiments, DBE 453 comprises a phase/delay/gain calibration block (e.g., phase/delay/gain calibration block 411) and the TTD digital beamformer (e.g., TTD digital beamformer 412). The digitally delayed received signals from all the tiles in a group of tiles (e.g., tiles for the Nth beam, tiles for the Pth beam, etc.) are received by the phase/delay/gain calibration block 411, which combines the digital versions of the received signals from the tiles in a group into one received signal for those tiles of a beam and sends this one signal to the TTD digital beamformer, which a received beam signal (e.g., a signal for RX beam 1, . . . , a signal RX beam P) that is provided to a modem/digital demodulator (e.g., a modem/digital demodulator 413). FIG. 8 illustrates some embodiments of a RX TTD digital beamformer 412 and its operation is described in more detail below.

Figure 5:
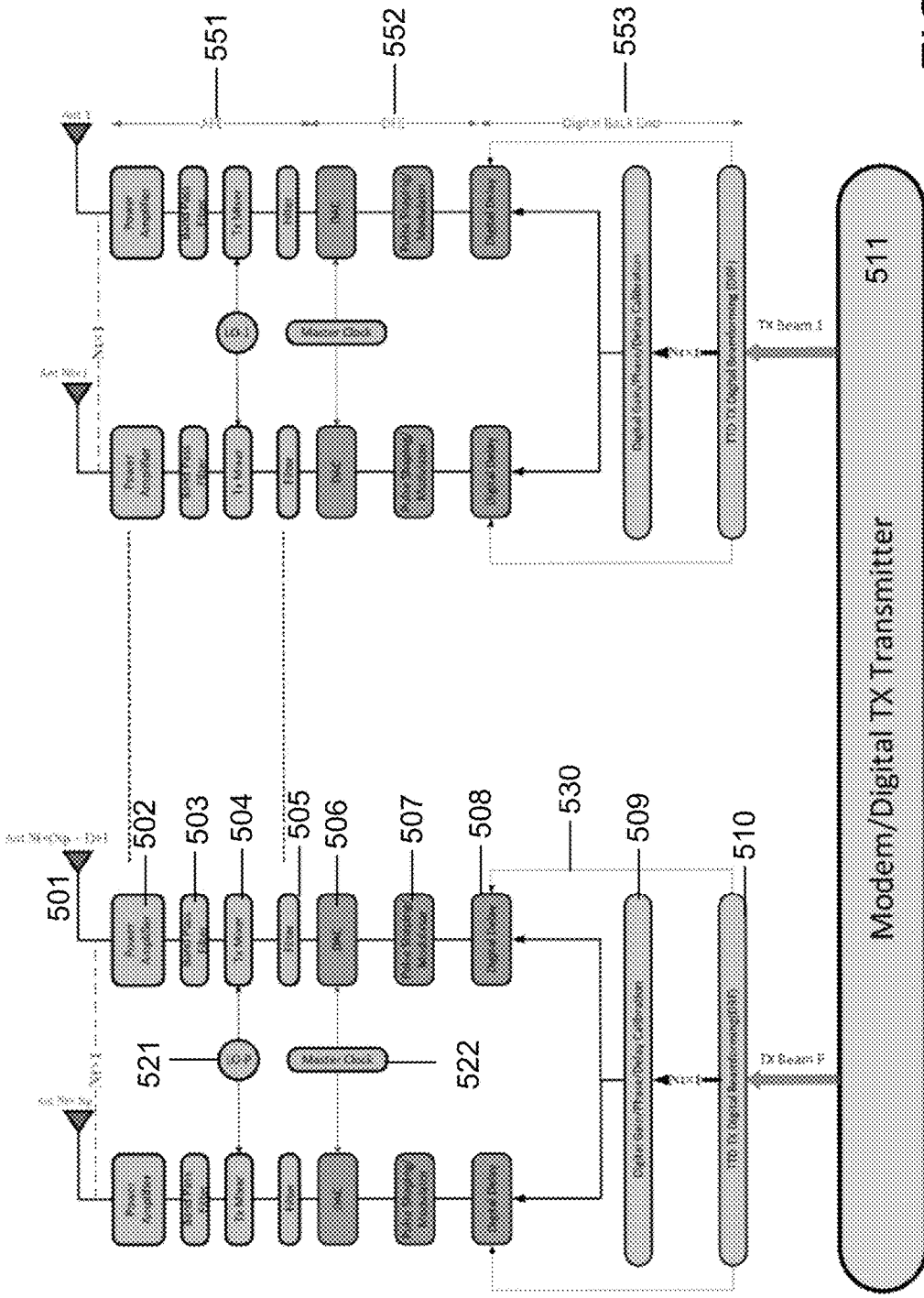
FIG. 5 illustrates some embodiments of a transmitter system architecture comprising $N_t$ tiles and each tile supports $N_p$ independent beams.

FIG. 5 illustrates some embodiments of a transmitter system architecture comprising $N_t$ tiles and each tile supports $N_p$ independent beams. In some embodiments, the transmitter system architecture comprises P feed ports to receive P feed waves to support the P independent transmit beams. In some embodiments, the transmitter system architecture design partitions $N_t \times N_p$ antenna tiles to produce a TX beam. In some embodiments, these partitioned antenna tiles produce a TX beam with minimal squint using time delay beamforming in digital baseband.

Figure 9:
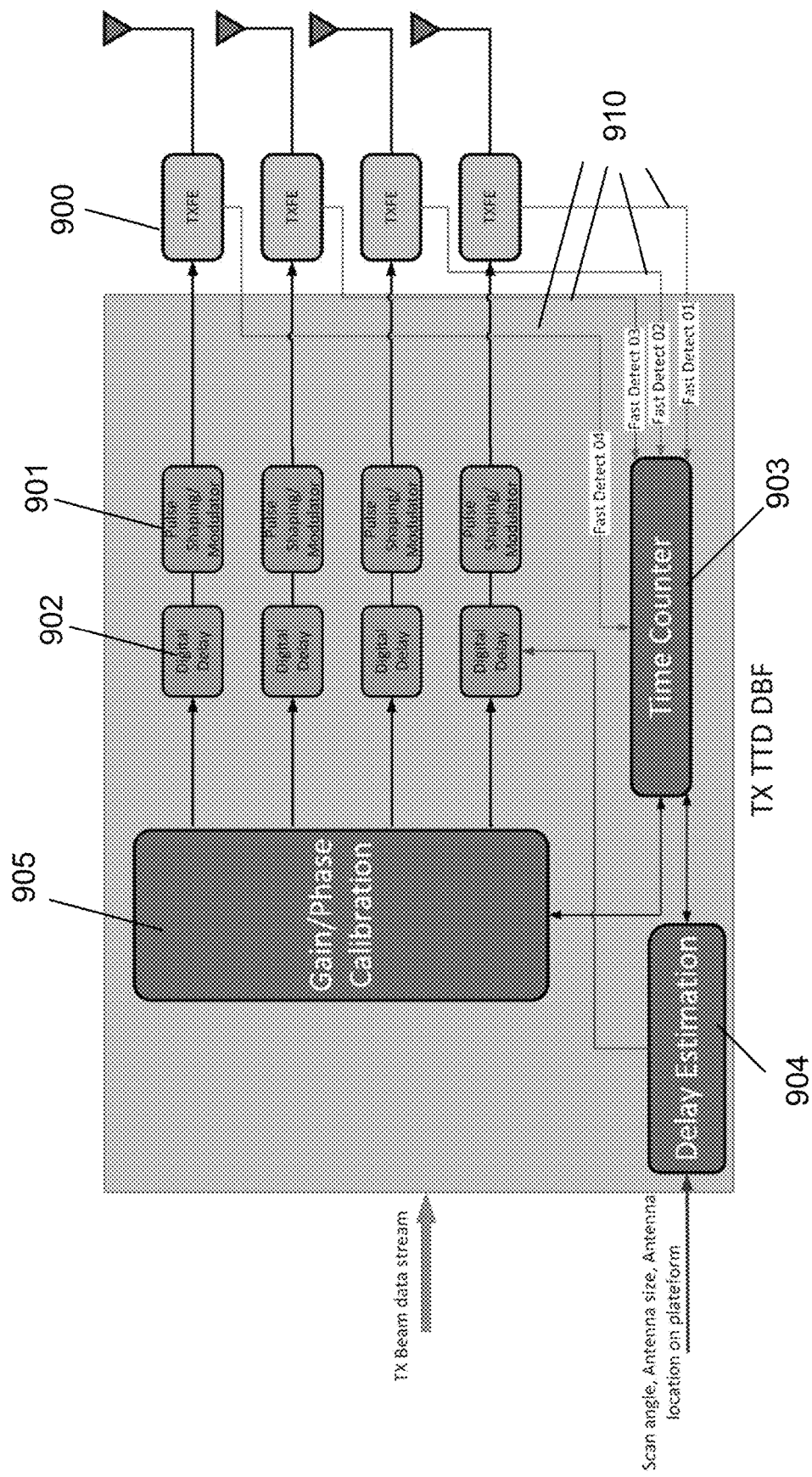
FIG. 9 is a block diagram of some embodiments of a transmitter true time delay beamforming (TX TTD DBF) of the TX system.

Referring to FIG. 5, a modem/digital TX transmitter (e.g., modem/digital TX transmitter 511) sends a separate transmit signal to be transmitted by transmit beams 1-P to the TX digital backend (DBE 553). DBE 553 performs TX time domain beamforming digitally and comprises a phase/delay/gain calibration block (e.g., phase/delay/gain calibration block 509) and a TTD TX digital beamformer (e.g., TTD TX digital beamformer 510). Each of the transmit beams undergoes TTD TX digital beamforming (DBF) using the TTD TX digital beamformer 510. As with the RX path, the digital gain/phase/delay calibration block 509 receives the output of the TTD TX digital beamformer 510. An example of the digital gain/phase/delay calibration block and its operation are shown in FIG. 9.

The output of the digital gain/phase/delay calibration block 509 is sent to digital delay blocks (e.g., digital delay block 508) for each of the TX metasurface antenna tiles. The digital delay blocks 508 compensate for the different delays associated with the digital and analog front ends associated with the metasurface antenna tiles. In some embodiments, the delays applied by the digital delay blocks 508 are based on a signal from the TTD TX digital beamformer 510.

The output of the digital delay blocks 508 of the metasurface antenna tiles is sent to the TX digital front end (DFE) 552 of the metasurface antenna. In some embodiments, the TX DFE 552 comprises a pulse shaper/modulator (e.g., pulse shaper/modulator 507) that receives the output from the digital delay block 508 and performs pulse shaping and modulation, and a digital-to-analog converter (DAC) (e.g., DAC 506) that takes the output of the pulse shaper/modulator 507 and converts it to analog. The analog output of the DAC is coupled to the input of TX AFC 551. In some embodiments, TX AFC 551 comprises a filter (e.g., filter 505) that filters the analog signal from the DAC 506, a TX mixer (e.g., TX mixer 504) that mixes the incoming signal from the filter with the signal from a local oscillator (LO) (e.g., LO 521). The output of the TX mixer 504 is filtered with a band pass filter (e.g., band pass filter 503) and the filtered signal is amplified with a power amplifier (e.g., power amplifier 502) before being transmitted with the antenna (e.g., antenna 501).

Figure 6A:
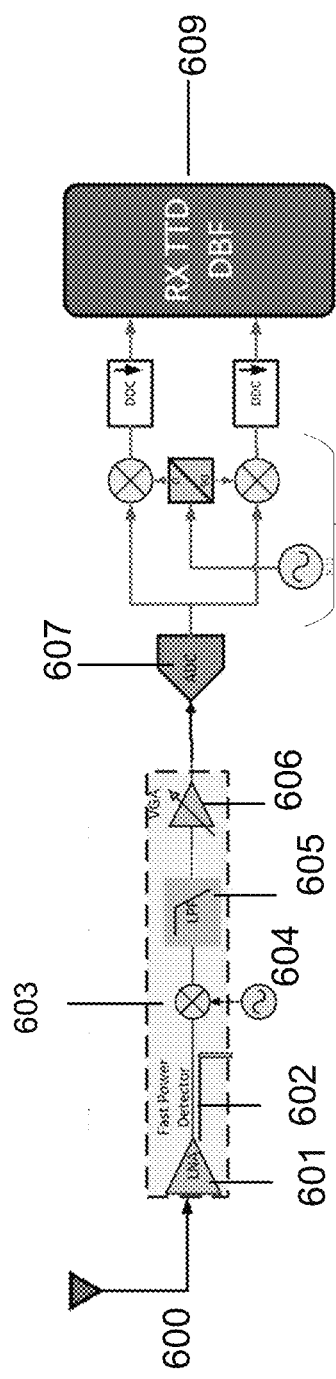
FIG. 6A illustrates a flexible single-stage heterodyne Software Defined Radio (SDR), RX architecture having a fast power detector with True Time Delay (TTD) digital beamformer.
Figure 6B:
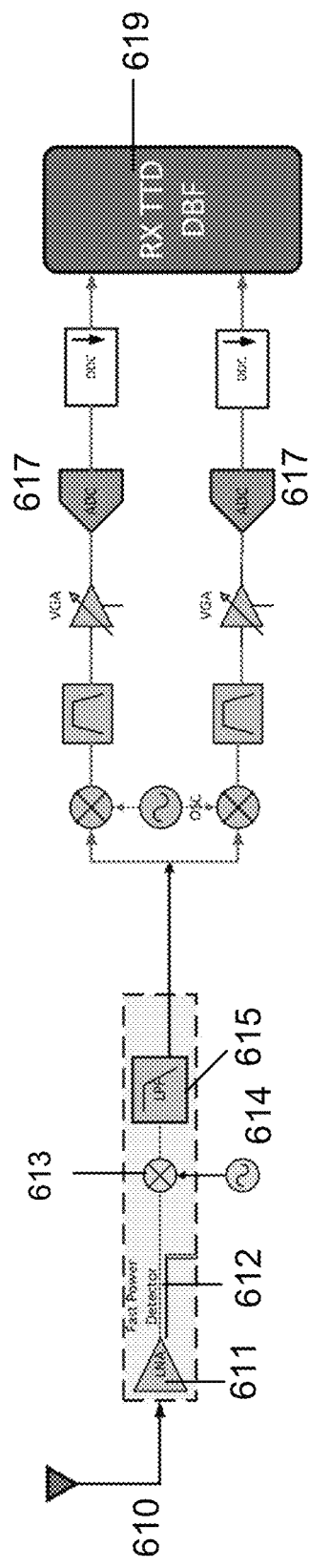
FIG. 6B illustrates a flexible two-stage heterodyne RX architecture having a fast power detector with a TTD digital beamformer.
Figure 6C:
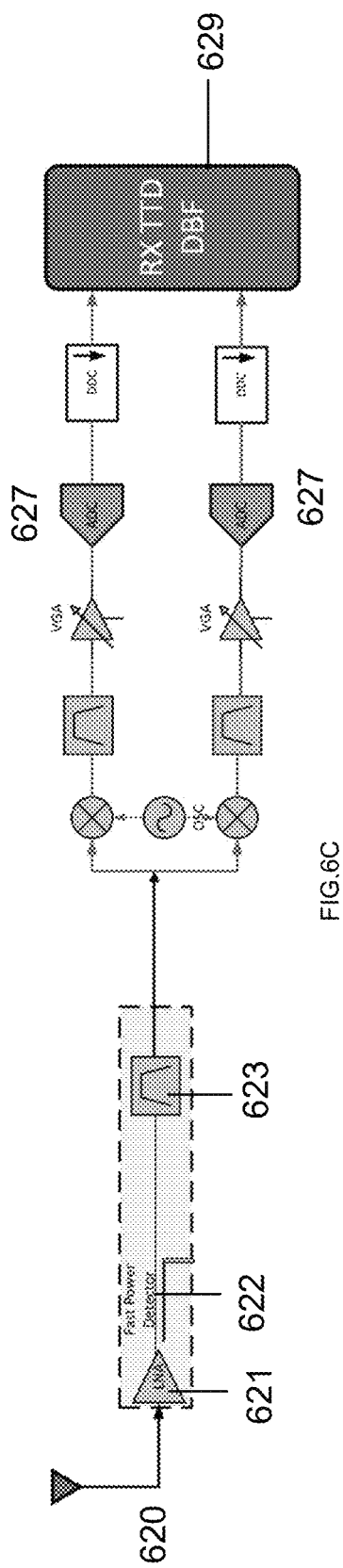
FIG. 6C illustrates a flexible direct conversion architecture having fast power detector with a TTD digital beamformer.

FIGS. 6A-6C illustrate some embodiments of receiver front end (RXFE) architectures that can be employed in the system to support a multi-tile antenna array. In some embodiments, the architecture includes a fast power detector that provides instantaneous (low latency) feedback to the beamforming system, which utilizes this feature for timing calibration in field or factory mode as discussed in conjunction with FIGS. 8 and 10. The fast power detector couples a part of the received signal for use in timing calibration. In some embodiments, the fast power detector includes a sensor at the output of the LNA in the analog RX AFE that is coupled to the antenna of the metasurface antenna tile.

In some embodiments, each of the RXFE architectures is coupled to a RX DFE, which is coupled to a RX TTD digital beamformer (DBF) that can accept multiple transceiver inputs.

FIG. 6A illustrates a flexible single-stage heterodyne software defined radio (SDR), RX architecture having a fast power detector with TTD digital beamformer, according to some embodiments. Referring to FIG. 6A, an antenna 600 of the metasurface antenna tile is coupled to an RF front end comprising an LNA 601, fast power detector 602, a mixer 603 (receiving a LO signal from LO 604), a low pass filter 605 and a variable gain amplifier (VGA) 606 coupled in series. In some embodiments, the RF front end can be a radio-frequency integrated circuit (RFIC) or monolithic microwave integrated circuit (MMIC) package. In some embodiments, the output of the RF front end is coupled to an analog-to-digital converter 607 to convert the received signal to digital format. The digitized signals is provided to a RX DFE 608 that produces and sends multiple transceiver inputs, via DDC converters, to a RX TTD digital beamformer (DBF) 609 that includes mixers and a phase splitter (receiving a LO signal from an LO). Thus, DBF 609 accepts multiple inputs.

FIG. 6B illustrates a flexible two-stage heterodyne RX architecture having a fast power detector with a TTD digital beamformer, according to some embodiments. Referring to FIG. 6B, an antenna 610 of the metasurface antenna tile is coupled to an RF front end comprising an LNA 611, fast power detector 612, a mixer 613 (receiving a LO signal from LO 614), and a low pass filter 615 coupled in series. In some embodiments, the output of the RF front end is coupled to the second stage of the two-stage heterodyne RX architecture that includes mixers (receiving a LO signal from an LO), a band pass filter, and VGAs coupled in series. The output of the second stage is coupled to a pair of analog-to-digital converters 617 to convert the received signal to digital format that are then digitally down converted with a DDC converter. The down converted digitized signals are provided to a RX TTD digital beamformer (DBF) 619. Thus, DBF 619 accepts multiple inputs.

FIG. 6C illustrates a flexible direct conversion architecture having fast power detector with a TTD digital beamformer, according to some embodiments. Referring to FIG. 6C, an antenna 620 of the metasurface antenna tile is coupled to an RF front end comprising an LNA 621, fast power detector 622, and a band pass filter 623 coupled in series. In some embodiments, the output of the RF front end is coupled to the second stage of the two-stage heterodyne RX architecture that includes mixers (receiving a LO signal from an LO), a band pass filter, and VGAs coupled in series. The output of the second stage is coupled to a pair of analog-to-digital converters 627 to convert the received signal to digital format that are then digitally down converted with a DDC converter. The down converted digitized signals are provided to a RX TTD digital beamformer (DBF) 629. Thus, DBF 629 accepts multiple inputs.

Figure 7A:
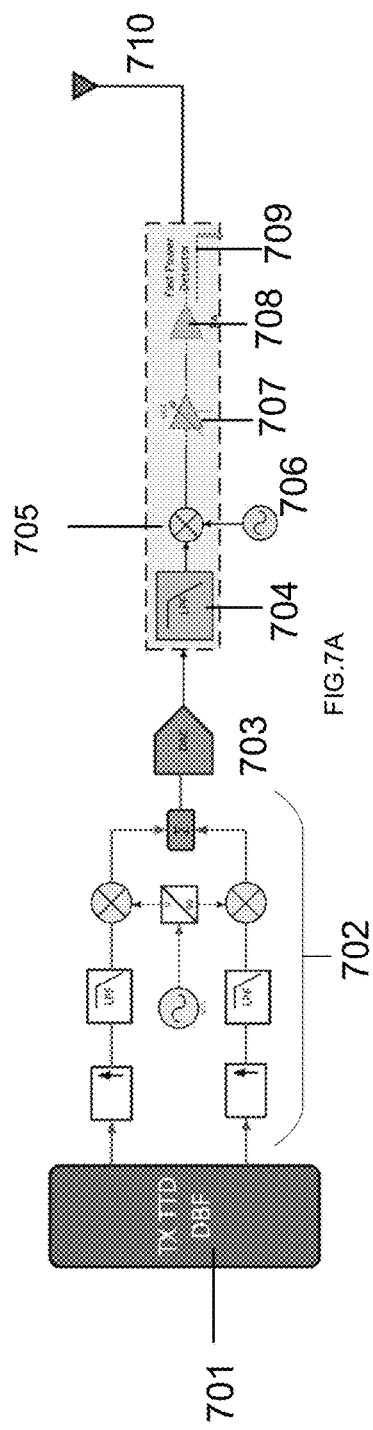
FIG. 7A illustrates flexible single stage heterodyne SDR, TX architecture having a fast power detector with a TTD digital beamformer.
Figure 7B:
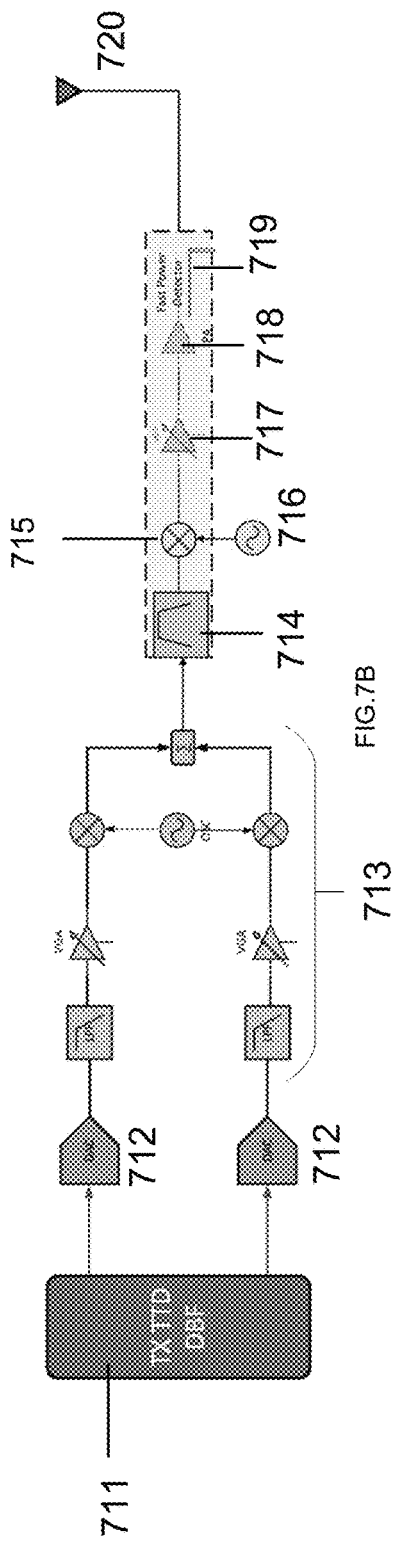
FIG. 7B illustrates a flexible two stage heterodyne TX architecture having a fast power detector with a TTD digital beamformer.
Figure 7C:
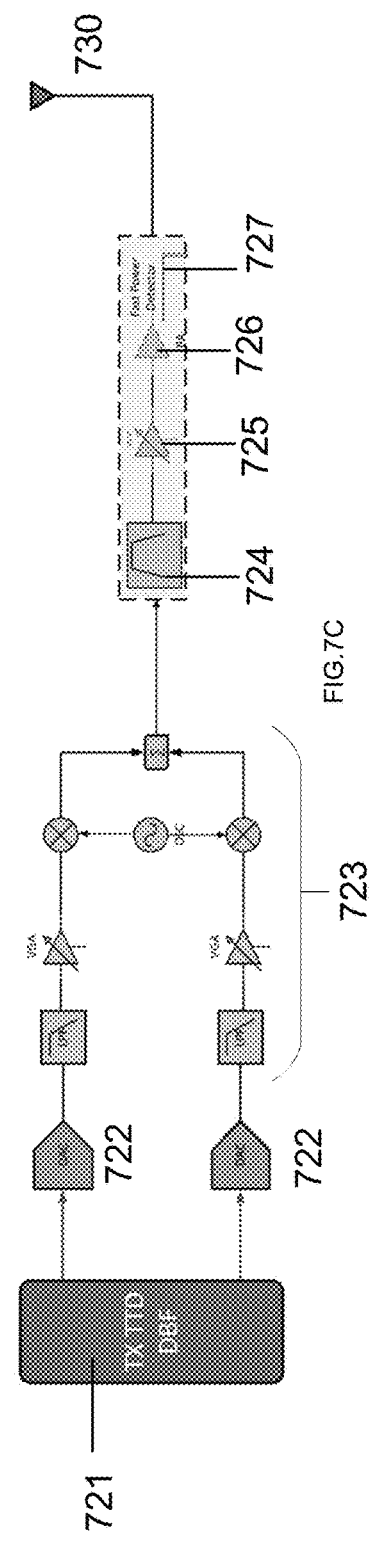
FIG. 7C illustrates a flexible direct conversion TX architecture having a fast power detector with a TTD digital beamformer.
Figures 10A, 10B:
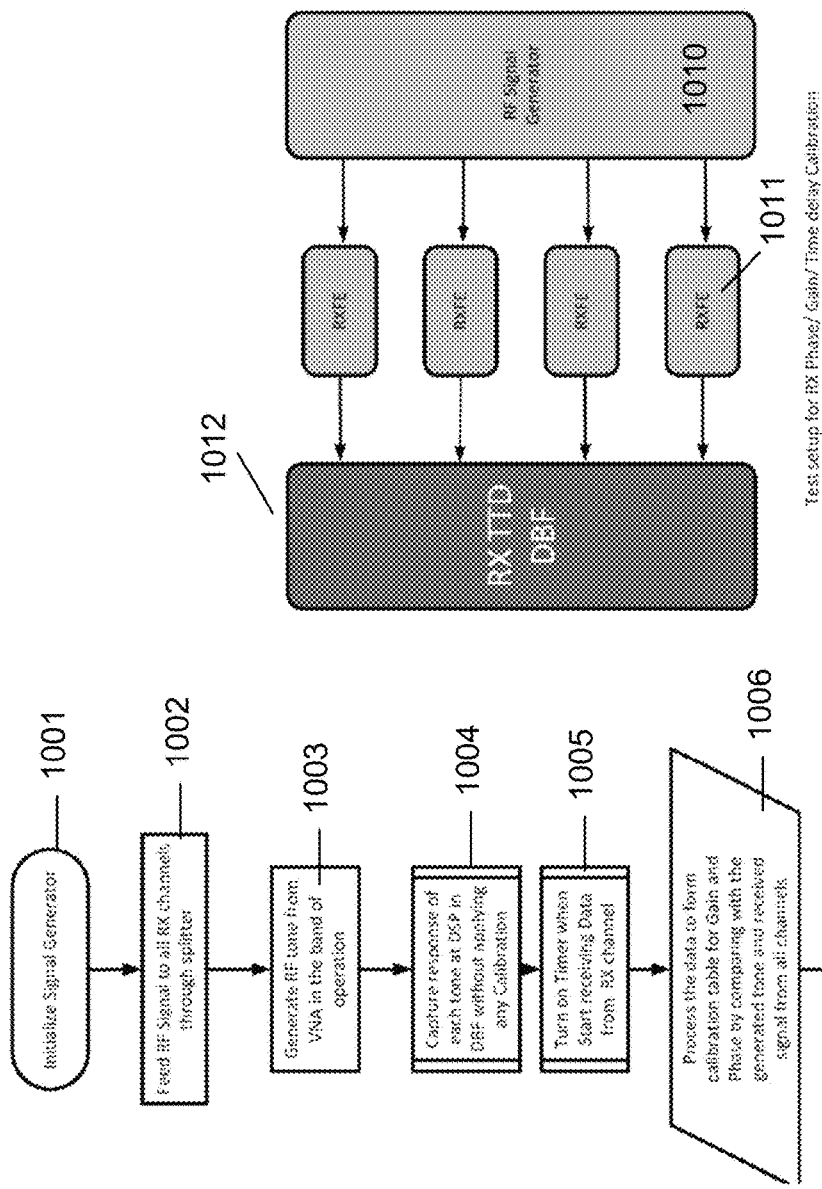

FIGS. 7A-7C illustrate example TX front end (TXFE) architectures to support a multi-tile antenna array in the system, according to some embodiments. In some embodiments, the architecture includes a fast power detector, which provides instantaneous (low latency) feedback to the beamforming subsystem, which then uses this feedback for timing calibration. In these cases, the fast power detector is at the output of the power amplifier in the TX AFE. In some embodiments, the fast power detector comprises a sensor as is described above in conjunction with the RX front end architectures. In some embodiments, the feedback is used for timing calibration in the field as illustrated in FIG. 9. In some embodiments, the feedback is used for timing calibration in factory mode as illustrated in FIGS. 10A and 10B.

FIG. 7A illustrates an embodiment including a flexible single stage heterodyne SDR, TX architecture having a fast power detector with a TTD digital beamformer. Referring to FIG. 7A, a TX TTD digital beamformer 701 produces multiple outputs to single stage heterodyne SDR 702, which sums the signals and outputs the summed signals to a digital-to-analog converter (DAC) 703, which converts the summed signal to analog format. The analog signal is then sent to a RF front end comprising a low pass filter 704, a mixer 705 (receiving a LO signal from LO 706), a variable gain amplifier (VGA) 707, a power amplifier (PA) 708, and a fast power detector 709, coupled in series. The output of the RF front end is coupled to antenna 710 of the metasurface antenna tile.

FIG. 7B illustrates a flexible two-stage heterodyne TX architecture having a fast power detector with a TTB digital beamformer, according to some embodiments. Referring to FIG. 7B, a TX TTD digital beamformer 711 produces multiple outputs to a pair of digital-to-analog converters (DACs) 712 which converts the pair of digital signals into analog signals. The analog signals are sent to a first analog stage of the two-stage heterodyne TX architecture 713, which sums the signals for transmission into a single analog signal at its output. The summed analog signal is then sent to a RF front end comprising a band pass filter 714, a mixer 715 (receiving a LO signal from LO 716), a variable gain amplifier (VGA) 717, a power amplifier (PA) 718, and a fast power detector 719, coupled in series. The output of the RF front end is coupled to antenna 720 of the metasurface antenna tile.

FIG. 7C illustrates a flexible direct conversion TX architecture having a fast power detector with a TTD digital beamformer, according to some embodiments. Referring to FIG. 7C, a TX TTD digital beamformer 721 produces multiple outputs to a pair of digital-to-analog converters (DACs) 722 which converts the pair of digital signals into analog signals. The analog signals are sent to a first analog stage of the direct conversion TX architecture 723, which sums the signals for transmission into a single analog signal at its output. The summed analog signal is then sent to a RF front end comprising a band pass filter 724, a variable gain amplifier (VGA) 725, a power amplifier (PA) 726, and a fast power detector 727, coupled in series. The output of the RF front end is coupled to antenna 730 of the metasurface antenna tile.

FIG. 8 is a block diagram of some embodiments of a RX true time delay beamforming (RX TTD DBF) of the RX system. Referring to FIG. 8, the RX TTD DBF comprises a timer counter 801, a gain/phase calibration block 802, digital delay units 803 coupled to receive the same received signal from each of the RXFEs 804 of each metasurface antenna tile, and a delay estimation unit 805 that controls the digital delay units 803, via a digital delay controller 806, and an adder unit 807. The timer counter 801 computes a time delay between different RX channels using the fast detect signals 810 that are fed from RXFEs 804 and are created in response to RXFEs 804 receiving a signal using their associated antennas. When timer counter 801 receives each of the fast detect signals 810, timer counter 801 starts a counter. The received signals pass from RXFEs 804 through digital delay units 803 to gain/phase calibration block 802. When each of those signals reaches gain/phase calibration block 802, gain/phase calibration block 802 signals to time counter 801 to stop the timer. Then delay estimation unit 805 computes the time delay between signal received from different tiles based on scan angle and tile size, tile location (e.g., placement among other tiles) and time calibration data measured by time counter 801. In some embodiments, using the time delay computed by delay estimation unit 805, the delay for each of the digital delay units 803 is then implemented by using up/down samplers and fractional delay units that are controlled by delay estimation unit 805. This ensures that the delay associated with each of the RX paths is adjusted so that all received beamformed data arrives and can be combined properly into a single received data stream. To that end, gain/phase calibration block 802 compensates for gain and phase differences between various RX channels. After performing gain and phase compensation, the received signals are combined using adder 807 and output as an RX beamformed data stream. In other words, gain/phase calibration block 802 compensates for the time difference for signals arriving from different tiles either using fractional digital delays in baseband after analog-to-digital (A/D) conversion or the equivalent processing in the frequency domain to align signals for coherent addition by adder 807. In some embodiments, the gain/phase calibration procedure operates as shown in FIG. 10.

FIG. 9 is a block diagram of some embodiments of a transmitter true time delay beamforming (TX TTD DBF) of the TX system. Referring to FIG. 9, the TX TTD DBF comprises a set of digital delay units 902 (one for each TX path), a TX pulse shaping/modulator 901 (one for each TX path), a time counter 903 and a delay estimation unit 904. Time counter 903 computes the time delay between signals for different TX chains using the fast detect signals 910 from TXFEs 900. Delay estimation unit 904 computes the time delay between signals transmitted to different tiles based on scan angle, tile size, tile placement among the other tiles, and calibration data from time counter 903. Delay estimation unit 904 also controls digital delay blocks 902 to configure the correct delay between different antenna tiles.

Figures 10C, 10D:
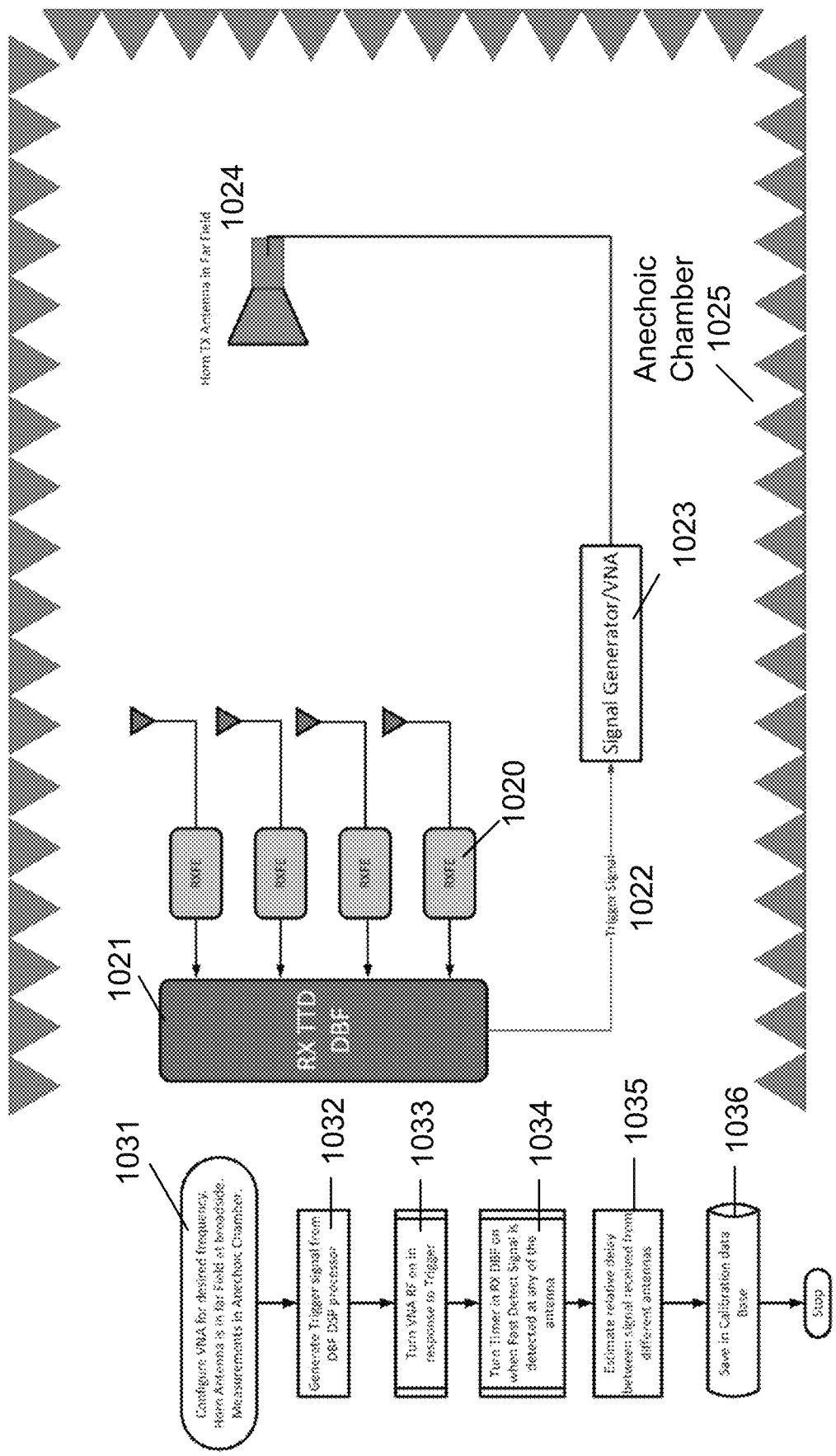

Gain/phase calibration block 905 compensates for gain/phase differences between different TX channels based on data from a calibration procedure, such as the one set forth in FIG. 10D. Gain/phase calibration block 905 generates multiple outputs to digital delay blocks 902 where delays can be applied. In some embodiments, gain/phase calibration block 905 applies the compensations to the incoming signals via a series of phase shifters and gain control blocks in order to idealize the array manifold for more consistent performance for mass produced antennas. These compensations may be performed either digitally or through analog circuits. The delayed signals then undergo pulse shaping and modulation before being sent to the TXFEs 900 for transmission using each of the antennas for the multiple tiles.

FIGS. 10A and 10B illustrate some embodiments of factory mode calibration for the RX chain used to form a beam from any set of antenna tiles in field mode. In FIG. 10A, the process of digital and RF chain gain/phase and delay calibration is illustrated. The total time delay for each RX channel can be caused by feed delay and RX system delay due to difference in digital/analog components. In some embodiments, the calibration process estimates the feed delay as well. In some embodiments, the RX tile feed delay calibration process in factory mode is performed inside an anechoic chamber. In some embodiments, the RX feed delay is also used to estimate TX feed delay.

Referring to FIG. 10A, the RF chain gain/phase and delay calibration process begins by initializing signal generator 1010 of FIG. 10B (processing block 1001). Next, processing logic feeds the same RF signal to all the RX channels through a splitter (processing block 1002). Then, processing logic generates the RF tone from a vector network analyzer (VNA) in the band of operation (processing block 1003). After generating the RF tone, processing logic (e.g., a DSP) in the DBF captures a response of each tone without applying any calibration (processing block 1004), and processing logic turns on a timer when data has started to be received from the RX channel (processing block 1005).

Processing logic processes the data to form a calibration table for the gain and phase by comparing the data with the generated tone received signals from all channels (processing block 1006). Once the data has been processed, processing logic estimates the delay from the timer counter for each RX channel (processing block 1007) and stores the associated delays a in a calibration database in order to compensate for the different delays associated with the receiver front ends (RXFE) (e.g., the AFE and DFE of each receive path of a tile) for the group of tiles receiving signals with one beam (processing block 1008).

FIGS. 10C and 10D illustrate some embodiments of factory mode calibration for a RX tile feed calibration process. In some embodiments, the RX tile feed delay calibration process is performed inside an anechoic chamber. Referring to FIGS. 10C and 10D, multiple RXFEs 1020 with their associated antennas sends received signals to RX TTD DBF 1021 while in an anechoic chamber 1025. Using anechoic chamber 1025, the process starts by configuring the signal generator/VNA 1023 for a desired frequency (processing block 1031) while a horn TX antenna 1024 in the far field at broadside transmits signals that are received by antennas of the RXFEs 1020. Measurements are taken in anechoic chamber 1025. In the process, processing logic in RX TTD DBF 1021 generates a trigger signal 1022. In some embodiments, trigger signal 1022 is generated by a DSP in RX TTD DBF 1021. In response to the trigger signal 1022, processing logic turns on the RF of signal generator/VNA 1023 (processing block 1033). Also in some embodiments, processing logic turns on a timer on in the RX DBF 1021 when a fast detect signal is detected at any of the antennas (processing block 1034). After this occurs, processing logic estimates the relative delay between the signals received from the different antennas and uses that estimate to calibrate the system so that signals received from all the antennas for the same beam may be combined into one signal (processing block 1035). Processing logic then saves calibration data related to the time delays in the calibration database (processing block 1036).

FIGS. 10E and 10F illustrates some embodiments of a factory mode calibration for TX channels used to form a beam using a partition of antenna array in field mode. More specifically, FIGS. 10E and 10F illustrates some embodiments of a process for gain/phase and delay calibration that is used to compensate for the total time delay for each TX channels is different due to differences/mismatch in digital/analog components in each TX chain.

Referring to FIGS. 10E and 10F, a process begins by processing logic configuring the vector signal analyzer 1042 for a desired tone frequency (processing block 1051) and sends a trigger signal 1041 to an RF vector signal analyzer 1042 to start the measurements (processing block 1052). In some embodiments, trigger signal 1041 is sent by TX TTD DBF 1040 to RF vector signal analyzer (VNA) 1042. Thereafter, processing logic generates a tone at all TX channels via TX front ends (TXFEs) 1043 in the TX TTD DBF 1040 by a DSP processor at different frequencies (processing block 1053). Also, processing logic starts a timer in the TX TTD DBF 1040 when the tone is turned on (processing block 1054). Processing logic stops the timer when the fast detect signal is detected (processing block 1055). At this point, processing logic measures the RF tone amplitude and power and relative phase from each channel (processing block 1056). Using this information, processing logic computes the gain and phase difference from the vector signal analyzer data (processing block 1057) and calculates the time delay from the timer/counter module (processing block 1058). Processing logic saves this information in the calibration data for the gain/phase/time delay block (processing block 1059).

In some embodiments, the system comprises a receiver and transmitter unit. During receiver system operation, the receiver operates by processing a signal received from each tile. During the processing, the receiver performs a timing alignment in digital domain and subsequently adds the signals to enhance G/T or (SNR). In some embodiments, the receiver includes a receiver front end (RXFE) and a receiver time domain beamformer (RX TTD DBF) that are connected to the antenna array. In some embodiments, the receiver frequency can also be dynamically changed by changing the receiver chain frequency synthesizer frequency. Furthermore, in some embodiments, since the metasurface antenna is software defined, the beam direction and the antenna tuning frequency can also be dynamically configured.

During transmitter system operation, the transmitter operates by feeding the signal to each TX antenna tile and performing the timing alignment in digital domain to obtain the resultant gain or EIRP. In some embodiments, the transmitter comprises a transmitter front end (TXFE) and transmitter time domain beamformer (TX TTD DBF) and these are connected to the antenna array. In some embodiments, the TX frequency can also be dynamically changed by changing the TX chain frequency synthesizer frequency. Furthermore, in some embodiments, since metasurface antenna is software defined, the beam direction and the antenna tuning frequency can also be dynamically configured since metasurface antenna is software defined, the beam direction and the antenna tuning frequency can also be dynamically configured.

Thus, embodiments disclosed herein include one or more improvements. First, in some embodiments, the communication system includes time delay beamforming in the digital domain with flexible architecture to estimate and compensate for the delay between different antenna for a range of scan angles dynamically by a software defined algorithm. Second, in some embodiments, the system overcomes beam squinting for transmit antenna caused by wide signal bandwidth by time delaying a signal fed to different antenna tiles dynamically by applying the delay in baseband. Since the metasurface can operate in different frequency bands during transmit, the delay can also be calibrated in the digital domain. Third, in some embodiments, embodiments of the communication system disclosed herein mitigates ISI (inter symbol interference) due to an electrically large, received antenna by using smaller metasurface antennas. In such a case, the system compensates for the time difference for signals arriving from different tiles either using fractional digital delays in baseband after analog-to-digital (A/D) conversion or the equivalent processing in the frequency domain to align signals for coherent addition.

Examples of Antenna Embodiments

The techniques described herein may be used with a variety of flat panel satellite antennas. Embodiments of such flat panel antennas are disclosed herein. In some embodiments, the flat panel satellite antennas are part of a satellite terminal. The flat panel antennas include one or more arrays of antenna elements on an antenna aperture.

In some embodiments, the antenna aperture is a metasurface antenna aperture, such as, for example, the antenna apertures described below. In some embodiments, the antenna elements comprise radio-frequency (RF) radiating antenna elements. In some embodiments, the antenna elements include tunable devices to tune the antenna elements. Examples of such tunable devices include diodes and varactors such as, for example, described in U.S. Pat. No. 11,489,266, entitled "Metasurface Antennas Manufactured with Mass Transfer Technologies," issued Nov. 1, 2022. In some other embodiments, the antenna elements comprise liquid crystal (LC)-based antenna elements, such as, for example, those disclosed in U.S. Pat. No. 9,887,456, entitled "Dynamic Polarization and Coupling Control from a Steerable Cylindrically Fed Holographic Antenna", issued Feb. 6, 2018, or other RF radiating antenna elements. It should be appreciated that other tunable devices such as, for example, but not limited to, tunable capacitors, tunable capacitance dies, packaged dies, micro-electromechanical systems (MEMS) devices, or other tunable capacitance devices, could be placed into an antenna aperture or elsewhere in variations on the embodiments described herein.

In some embodiments, the antenna aperture having the one or more arrays of antenna elements is comprised of multiple segments that are coupled together. In some embodiments, when coupled together, the combination of the segments form groups of antenna elements (e.g., closed concentric rings of antenna elements concentric with respect to the antenna feed, etc.). For more information on antenna segments, see U.S. Pat. No. 9,887,455, entitled "Aperture Segmentation of a Cylindrical Feed Antenna", issued Feb. 6, 2018.

Figure 11:
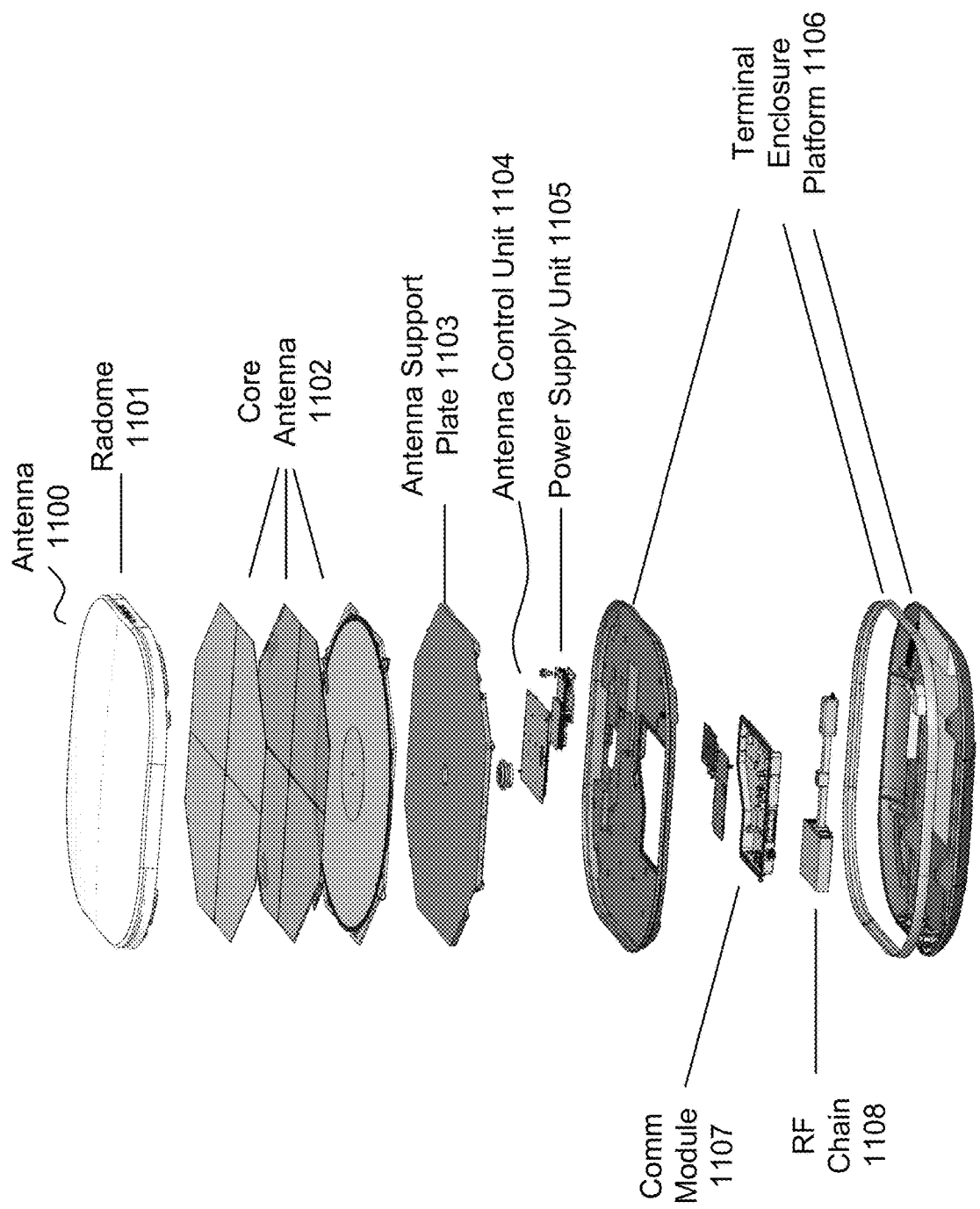
FIG. 11 illustrates an exploded view of some embodiments of a flat-panel antenna.

FIG. 11 illustrates an exploded view of some embodiments of a flat-panel antenna. Referring to FIG. 11, antenna 1100 comprises a radome 1101, a core antenna 1102, antenna support plate 1103, antenna control unit (ACU) 1104, a power supply unit 1105, terminal enclosure platform 1106, comm (communication) module 1107, and RF chain 1108.

Radome 1101 is the top portion of an enclosure that encloses core antenna 1102. In some embodiments, radome 1101 is weatherproof and is constructed of material transparent to radio waves to enable beams generated by core antenna 1102 to extend to the exterior of radome 1101.

In some embodiments, core antenna 1102 comprises an aperture having RF radiating antenna elements. These antenna elements act as radiators (or slot radiators). In some embodiments, the antenna elements comprise scattering metamaterial antenna elements. In some embodiments, the antenna elements comprise both Receive (Rx) and Transmit (Tx) irises, or slots, that are interleaved and distributed on the whole surface of the antenna aperture of core antenna 1102. Such Rx and Tx irises may be in groups of two or more sets where each set is for a separately and simultaneously controlled band. Examples of such antenna elements with irises are described in U.S. Pat. No. 10,892,553, entitled "Broad Tunable Bandwidth Radial Line Slot Antenna", issued Jan. 12, 2021.

In some embodiments, the antenna elements comprise irises (iris openings) and the aperture antenna is used to generate a main beam shaped by using excitation from a cylindrical feed wave for radiating the iris openings through tunable elements (e.g., diodes, varactors, patch, etc.). In some embodiments, the antenna elements can be excited to radiate a horizontally or vertically polarized electric field at desired scan angles.

In some embodiments, a tunable element (e.g., diode, varactor, patch etc.) is located over each iris slot. The amount of radiated power from each antenna element is controlled by applying a voltage to the tunable element using a controller in ACU 1104. Traces in core antenna 1102 to each tunable element are used to provide the voltage to the tunable element. The voltage tunes or detunes the capacitance and thus the resonance frequency of individual elements to effectuate beam forming. The voltage required is dependent on the tunable element in use. Using this property, in some embodiments, the tunable element (e.g., diode, varactor, LC, etc.) integrates an on/off switch for the transmission of energy from a feed wave to the antenna element. When switched on, an antenna element emits an electromagnetic wave like an electrically small dipole antenna. Note that the teachings herein are not limited to having unit cell that operates in a binary fashion with respect to energy transmission. For example, in some embodiments in which varactors are the tunable element, there are 32 tuning levels. As another example, in some embodiments in which LC is the tunable element, there are 16 tuning levels.

A voltage between the tunable element and the slot can be modulated to tune the antenna element (e.g., the tunable resonator/slot). Adjusting the voltage varies the capacitance of a slot (e.g., the tunable resonator/slot). Accordingly, the reactance of a slot (e.g., the tunable resonator/slot) can be varied by changing the capacitance. Resonant frequency of the slot also changes according to the equation $$f = \frac{1}{2\pi\sqrt{LC}}$$

where f is the resonant frequency of the slot and L and C are the inductance and capacitance of the slot, respectively. The resonant frequency of the slot affects the energy coupled from a feed wave propagating through the waveguide to the antenna elements.

In particular, the generation of a focused beam by the metamaterial array of antenna elements can be explained by the phenomenon of constructive and destructive interference, which is well known in the art. Individual electromagnetic waves sum up (constructive interference) if they have the same phase when they meet in free space to create a beam, and waves cancel each other (destructive interference) if they are in opposite phase when they meet in free space. If the slots in core antenna 1102 are positioned so that each successive slot is positioned at a different distance from the excitation point of the feed wave, the scattered wave from that antenna element will have a different phase than the scattered wave of the previous slot. In some embodiments, if the slots are spaced one quarter of a wavelength apart, each slot will scatter a wave with a one fourth phase delay from the previous slot. In some embodiments, by controlling which antenna elements are turned on or off (i.e., by changing the pattern of which antenna elements are turned on and which antenna elements are turned off) or which of the multiple tuning levels is used, a different pattern of constructive and destructive interference can be produced, and the antenna can change the direction of its beam(s).

In some embodiments, core antenna 1102 includes a coaxial feed that is used to provide a cylindrical wave feed via an input feed, such as, for example, described in U.S. Pat. No. 9,887,456, entitled "Dynamic Polarization and Coupling Control from a Steerable Cylindrically Fed Holographic Antenna", issued Feb. 6, 2018 or in U.S. Patent Application Publication No. 20210050671, entitled "Metasurface Antennas Manufactured with Mass Transfer Technologies," published Feb. 18, 2021. In some embodiments, the cylindrical wave feed feeds core antenna 1102 from a central point with an excitation that spreads outward in a cylindrical manner from the feed point. In other words, the cylindrically fed wave is an outward travelling concentric feed wave. Even so, the shape of the cylindrical feed antenna around the cylindrical feed can be circular, square or any shape. In some other embodiments, a cylindrically fed antenna aperture creates an inward travelling feed wave. In such a case, the feed wave most naturally comes from a circular structure.

In some embodiments, the core antenna comprises multiple layers. These layers include the one or more substrate layers forming the RF radiating antenna elements. In some embodiments, these layers may also include impedance matching layers (e.g., a wide-angle impedance matching (WAIM) layer, etc.), one or more spacer layers and/or dielectric layers. Such layers are well-known in the art.

Antenna support plate 1103 is coupled to core antenna 1102 to provide support for core antenna 1102. In some embodiments, antenna support plate 1103 includes one or more waveguides and one or more antenna feeds to provide one or more feed waves to core antenna 1102 for use by antenna elements of core antenna 1102 to generate one or more beams.

ACU 1104 is coupled to antenna support plate 1103 and provides controls for antenna 1100. In some embodiments, these controls include controls for drive electronics for antenna 1100 and a matrix drive circuitry to control a switching array interspersed throughout the array of RF radiating antenna elements. In some embodiments, the matrix drive circuitry uses unique addresses to apply voltages onto the tunable elements of the antenna elements to drive each antenna element separately from the other antenna elements. In some embodiments, the drive electronics for ACU 1104 comprise commercial off-the shelf LCD controls used in commercial television appliances that adjust the voltage for each antenna element.

More specifically, in some embodiments, ACU 1104 supplies an array of voltage signals to the tunable devices of the antenna elements to create a modulation, or control, pattern. The control pattern causes the elements to be tuned to different states. In some embodiments, ACU 1104 uses the control pattern to control which antenna elements are turned on or off (or which of the tuning levels is used) and at which phase and amplitude level at the frequency of operation. The elements are selectively detuned for frequency operation by voltage application. In some embodiments, multistate control is used in which various elements are turned on and off to varying levels, further approximating a sinusoidal control pattern, as opposed to a square wave (i.e., a sinusoid gray shade modulation pattern).

In some embodiments, ACU 1104 also contains one or more processors executing the software to perform some of the control operations. ACU 1104 may control one or more sensors (e.g., a GPS receiver, a three-axis compass, a 3-axis accelerometer, 3-axis gyro, 3-axis magnetometer, etc.) to provide location and orientation information to the processor(s). The location and orientation information may be provided to the processor(s) by other systems in the earth station and/or may not be part of the antenna system.

Antenna 1100 also includes a comm (communication) module 1107 and an RF chain 1108. Comm module 1107 includes one or more modems enabling antenna 1100 to communicate with various satellites and/or cellular systems, in addition to a router that selects the appropriate network route based on metrics (e.g., quality of service (QOS) metrics, e.g., signal strength, latency, etc.). RF chain 1108 converts analog RF signals to digital form. In some embodiments, RF chain 1108 comprises electronic components that may include amplifiers, filters, mixers, attenuators, and detectors.

Antenna 1100 also includes power supply unit 1105 to provide power to various subsystems or parts of antenna 1100.

Antenna 1100 also includes terminal enclosure platform 1106 that forms the enclosure for the bottom of antenna 1100. In some embodiments, terminal enclosure platform 1106 comprises multiple parts that are coupled to other parts of antenna 1100, including radome 1101, to enclose core antenna 1102.

Figure 12:
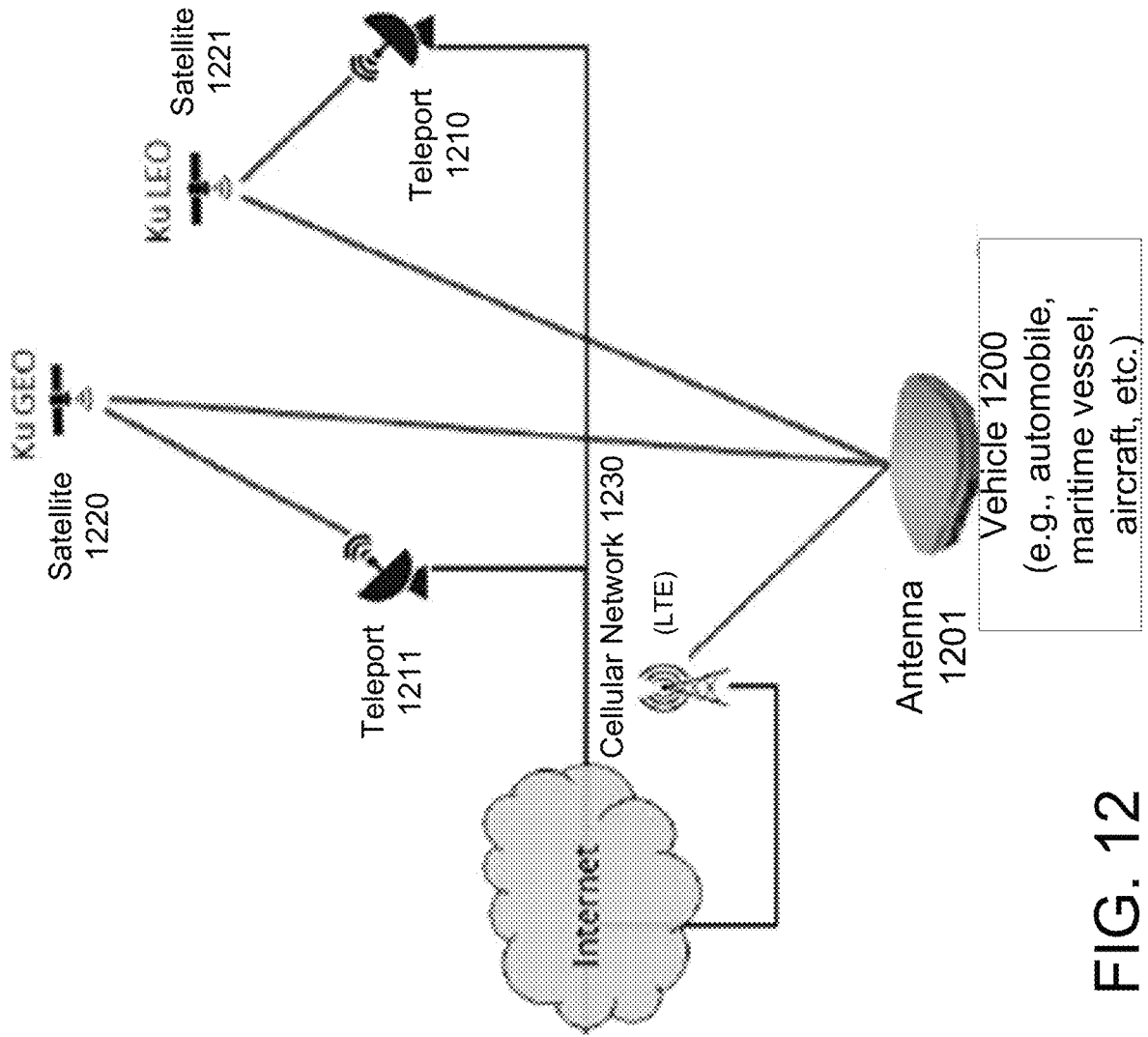
FIG. 12 illustrates an example of a communication system that includes one or more antennas described herein.

FIG. 12 illustrates an example of a communication system that includes one or more antennas described herein. Referring to FIG. 12, vehicle 1200 includes an antenna 1201. In some embodiments, antenna 1201 comprises antenna 1100 of FIG. 11. In some embodiments, vehicle 1200 may comprise any one of several vehicles, such as, for example, but not limited to, an automobile (e.g., car, truck, bus, etc.), a maritime vehicle (e.g., boat, ship, etc.), airplanes (e.g., passenger jets, military jets, small craft planes, etc.), etc. Antenna 1201 may be used to communicate while vehicle 1200 is either on-the-pause, or moving. Antenna 1201 may be used to communicate to fixed locations as well, e.g., remote industrial sites (mining, oil, and gas) and/or remote renewable energy sites (solar farms, windfarms, etc.).

In some embodiments, antenna 1201 is able to communicate with one or more communication infrastructures (e.g., satellite, cellular, networks (e.g., the Internet), etc.). For example, in some embodiments, antenna 1201 is able to communicate with satellites 1220 (e.g., a GEO satellite) and 1221 (e.g., a LEO satellite), cellular network 1230 (e.g., an LTE, etc.), as well as network infrastructures (e.g., edge routers, Internet, etc.). For example, in some embodiments, antenna 1201 comprises one or more satellite modems (e.g., a GEO modem, a LEO modem, etc.) to enable communication with various satellites such as satellite 1220 (e.g., a GEO satellite) and satellite 1221 (e.g., a LEO satellite) and one or more cellular modems to communicate with cellular network 1230. For another example of an antenna communicating with one or more communication infrastructures, see U.S. patent Ser. No. 16/750,439, entitled "Multiple Aspects of Communication in a Diverse Communication Network", and filed Jan. 23, 2020.

In some embodiments, to facilitate communication with various satellites, antenna 1201 performs dynamic beam steering. In such a case, antenna 1201 is able to dynamically change the direction of a beam that it generates to facilitate communication with different satellites. In some embodiments, antenna 1201 includes multi-beam beam steering that allows antenna 1201 to generate two or more beams at the same time, thereby enabling antenna 1201 to communication with more than one satellite at the same time. Such functionality is often used when switching between satellites (e.g., performing a handover). For example, in some embodiments, antenna 1201 generates and uses a first beam for communicating with satellite 1220 and generates a second beam simultaneously to establish communication with satellite 1221. After establishing communication with satellite 1221, antenna 1201 stops generating the first beam to end communication with satellite 1220 while switching over to communicate with satellite 1221 using the second beam. For more information on multi-beam communication, see U.S. Pat. No. 11,063,661, entitled "Beam Splitting Hand Off Systems Architecture", issued Jul. 13, 2021; U.S. patent application publication no. 20220328965, entitled "Hybrid Center-Fed Edge-Fed Metasurface Antenna with Dual-Beam Capabilities,", and filed Mar. 29, 2022; and U.S. patent application publication no. 20220006511, entitled "Multi-Beam Metasurface Antenna", filed Apr. 29, 2021.

In some embodiments, antenna 1201 uses path diversity to enable a communication session that is occurring with one communication path (e.g., satellite, cellular, etc.) to continue during and after a handover with another communication path (e.g., a different satellite, a different cellular system, etc.). For example, if antenna 1201 is in communication with satellite 1220 and switches to satellite 1221 by dynamically changing its beam direction, its session with satellite 1220 is combined with the session occurring with satellite 1221.

Thus, the antennas described herein may be part of a satellite terminal that enables ubiquitous communications and multiple different communication connections.

There are a number of example embodiments described herein.

Example 1 is an antenna architecture comprising: a plurality of metasurface antenna tiles, each metasurface antenna tile of the plurality of metasurface antenna tiles having one or more feed ports individually fed when in operation to support one or more independent beams, wherein the plurality of metasurface antenna tiles comprise a plurality of sub-arrays of metasurface antenna tiles; a plurality of digital back ends (DBEs) coupled to the plurality of metasurface antenna tiles, wherein each DBE of the plurality of DBEs is coupled to one sub-array of the plurality of sub-arrays of metasurface antenna tiles to: adjust time delays of one or more of received signals arriving from metasurface antenna tiles of the one sub-array of metasurface antenna tiles as part of time delay beamforming and combine the received signals in a digital domain to produce one or more beamformed signals, and delay transmit signals fed to the plurality of tiles in the digital domain by adjusting time delays of one or more of the transmit signals as part of time delay beamforming, wherein the time delays applied to received and transmit signals compensate for differences in receive and transmit paths, respectively, and in feed delays for each of the plurality of metasurface antenna tiles.

Example 2 is the antenna architecture of example 1 that may optionally include that each of the plurality of DBEs comprises a receive true time delay (TTD) digital beamformer to perform the time delay beamforming in the digital domain on the received signals in the digital domain.

Example 3 is the antenna architecture of example 2 that may optionally include a plurality of digital delays, each digital delay coupled to one DBE of the plurality of DBEs to apply a delay in the digital domain to one of the received signals from one of metasurface antenna tiles of the plurality of metasurface antenna tiles based on an input received from the digital beamformer of the one DBE.

Example 4 is the antenna architecture of example 2 that may optionally include that each of the metasurface antenna tiles comprises a power detector coupled to a portion of a received signal.

Example 5 is the antenna architecture of example 2 that may optionally include a time counter to receive signals from power detectors of the plurality of metasurface antenna tiles and compute a time delay between different received signals; a delay estimation unit to compute the time delay between received signals from different metasurface antenna tiles of the plurality of metasurface antenna tiles based on scan angle, tile size, tile location, and time calibration data from the time counter; and a plurality of digital delays coupled to the delay estimation unit to apply delays in the digital domain to one or more of the received signals based on output from the delay estimation unit.

Example 6 is the antenna architecture of example 5 that may optionally include that a gain calibration unit to compensate for gain differences between digitally delayed received signals output from the plurality of digital delays; and an adder coupled to the gain calibration unit to combine gain-compensated signals output from the gain calibration unit into a receive beamformed data stream.

Example 7 is the antenna architecture of example 1 that may optionally include that each of the plurality of DBEs comprises a transmit TTD digital beamformer to perform time delay beamforming on the transmit signals in the digital domain.

Example 8 is the antenna architecture of example 7 that may optionally include that each of the metasurface antenna tiles comprises a power detector coupled to a portion of a transmit signal to the transmit TTD digital beamformer.

Example 9 is the antenna architecture of example 7 that may optionally include a time counter to receive signals from power detectors of the plurality of metasurface antenna tiles and compute a time delay between different the transmit signals; a delay estimation unit to compute the time delay between transmit signals from different metasurface antenna tiles of the plurality of metasurface antenna tiles based on scan angle, tile size, tile location and time calibration data from the time counter; and a plurality of digital delays coupled to the delay estimation unit to apply delays in the digital domain to one or more of the transmit signals based on output from the delay estimation unit.

Example 10 is the antenna architecture of example 9 that may optionally include that a gain calibration unit coupled to receive a transmit beam data stream and to compensate for gain differences between signals to be transmitted from the transmit beam data stream. the gain-compensated transmit signals being output to the plurality of digital delays.

Example 11 is the antenna architecture of example 1 that may optionally include that the time delays are generated by self-calibration.

Example 12 is the antenna architecture of example 1 that may optionally include that the feed delays are a function of geometry of each sub-array of the plurality of sub-arrays and spacing between the plurality of sub-arrays.

Example 13 is the antenna architecture of example 1 that may optionally include that the plurality of metasurface antenna tiles is dynamically configurable to produce multiple beams from one or more individual metasurface antenna tiles or from different sub-arrays of the plurality of sub-arrays.

Example 14 is the antenna architecture of example 1 that may optionally include that a controller coupled to the plurality of metasurface antenna tiles to dynamically configure the plurality of metasurface antenna tiles to generate different numbers of beams with one or more frequencies among the beams.

Example 15 is an antenna architecture comprising: a plurality of metasurface antenna tiles, each metasurface antenna tile of the plurality of metasurface antenna tiles having one or more feed ports configured to be individually fed to support one or more independent beams, wherein the plurality of metasurface antenna tiles is configurable into a plurality of sub-arrays of metasurface antenna tiles to produce multiple simultaneous beams from one or more individual metasurface antenna tiles or from different sub-arrays of the plurality of sub-arrays; a plurality of digital back ends (DBEs) coupled to the plurality of metasurface antenna tiles, wherein each DBE of the plurality DBEs is coupled to one sub-array of the plurality of sub-arrays of metasurface antenna tiles to: adjust time delays of one or more of received signals arriving from metasurface antenna tiles of the one sub-array of metasurface antenna tiles as part of time delay beamforming and combine the received signals in a digital domain to produce one or more beamformed signals, and delay transmit signals fed to the plurality of tiles in the digital domain by adjusting time delays of one or more of the transmit signals as part of time delay beamforming, wherein the time delays applied to received and transmit signals compensate for differences in receive and transmit paths, respectively, and in feed delays for each of the plurality of metasurface antenna tiles, the feed delays being a function of geometry of each sub-array of the plurality of sub-arrays and spacing between the plurality of sub-arrays.

Example 16 is the antenna architecture of example 15 that may optionally include that the time delays are generated by self-calibration.

Example 17 is the antenna architecture of example 15 that may optionally include that each of the plurality of DBEs comprises a true time delay (TTD) digital beamformer to perform the time delay beamforming in the digital domain.

Example 18 is the antenna architecture of example 17 that may optionally include that each of the metasurface antenna tiles comprises a power detector coupled to the TTD digital beamformer to send a portion of a signal from a front end of said each metasurface antenna tile to the TTD digital beamformer.

Example 19 is the antenna architecture of example 15 that may optionally include a time counter to receive signals from power detectors of the plurality of metasurface antenna tiles and compute a time delay between different the power detector signals; a delay estimation unit to compute the time delay between signals from different metasurface antenna tiles of the plurality of metasurface antenna tiles based on scan angle, tile size, tile location, and time calibration data from the time counter; and a plurality of digital delays coupled to the delay estimation unit to apply delays in the digital domain to one or more of the signals based on output from the delay estimation unit.

Example 20 is the antenna architecture of example 15 that may optionally include that the plurality of metasurface antenna tiles are dynamically configurable to generate different numbers of beams at multiple frequencies.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

We claim:

1. An antenna architecture comprising:
a plurality of metasurface antenna tiles, each metasurface antenna tile of the plurality of metasurface antenna tiles having one or more feed ports individually fed when in operation to support one or more independent beams, wherein the plurality of metasurface antenna tiles comprise a plurality of sub-arrays of metasurface antenna tiles;
a plurality of digital back ends (DBEs) coupled to the plurality of metasurface antenna tiles, wherein each DBE of the plurality of DBEs is coupled to one sub-array of the plurality of sub-arrays of metasurface antenna tiles to:
adjust time delays of one or more of received signals arriving from metasurface antenna tiles of the one sub-array of metasurface antenna tiles as part of time delay beamforming and combine the received signals in a digital domain to produce one or more beamformed signals, and
delay transmit signals fed to the plurality of tiles in the digital domain by adjusting time delays of one or more of the transmit signals as part of time delay beamforming,
wherein the time delays applied to received and transmit signals compensate for differences in receive and transmit paths, respectively, and in feed delays for each of the plurality of metasurface antenna tiles.

2. The antenna architecture of claim 1 wherein each of the plurality of DBEs comprises a receive true time delay (TTD) digital beamformer to perform the time delay beamforming in the digital domain on the received signals in the digital domain.

3. The antenna architecture of claim 2 further comprising a plurality of digital delays, each digital delay coupled to one DBE of the plurality of DBEs to apply a delay in the digital domain to one of the received signals from one of metasurface antenna tiles of the plurality of metasurface antenna tiles based on an input received from the digital beamformer of the one DBE.

4. The antenna architecture of claim 2 wherein each of the metasurface antenna tiles comprises a power detector coupled to a portion of a received signal.

5. The antenna architecture of claim 2 further comprising:
a time counter to receive signals from power detectors of the plurality of metasurface antenna tiles and compute a time delay between different received signals;
a delay estimation unit to compute the time delay between received signals from different metasurface antenna tiles of the plurality of metasurface antenna tiles based on scan angle, tile size, tile location, and time calibration data from the time counter; and
a plurality of digital delays coupled to the delay estimation unit to apply delays in the digital domain to one or more of the received signals based on output from the delay estimation unit.

6. The antenna architecture of claim 5 further comprising:
a gain calibration unit to compensate for gain differences between digitally delayed received signals output from the plurality of digital delays; and
an adder coupled to the gain calibration unit to combine gain-compensated signals output from the gain calibration unit into a receive beamformed data stream.

7. The antenna architecture of claim 1 wherein each of the plurality of DBEs comprises a transmit TTD digital beamformer to perform time delay beamforming on the transmit signals in the digital domain.

8. The antenna architecture of claim 7 wherein each of the metasurface antenna tiles comprises a power detector coupled to a portion of a transmit signal to the transmit TTD digital beamformer.

9. The antenna architecture of claim 7 further comprising:
a time counter to receive signals from power detectors of the plurality of metasurface antenna tiles and compute a time delay between different the transmit signals;
a delay estimation unit to compute the time delay between transmit signals from different metasurface antenna tiles of the plurality of metasurface antenna tiles based on scan angle, tile size, tile location and time calibration data from the time counter; and
a plurality of digital delays coupled to the delay estimation unit to apply delays in the digital domain to one or more of the transmit signals based on output from the delay estimation unit.

10. The antenna architecture of claim 9 further comprising a gain calibration unit coupled to receive a transmit beam data stream and to compensate for gain differences between signals to be transmitted from the transmit beam data stream, the gain-compensated transmit signals being output to the plurality of digital delays.

11. The antenna architecture of claim 1 wherein the time delays are generated by self-calibration.

12. The antenna architecture of claim 1 wherein the feed delays are a function of geometry of each sub-array of the plurality of sub-arrays and spacing between the plurality of sub-arrays.

13. The antenna architecture of claim 1 wherein the plurality of metasurface antenna tiles is dynamically configurable to produce multiple beams from one or more individual metasurface antenna tiles or from different sub-arrays of the plurality of sub-arrays.

14. The antenna architecture of claim 1 further comprising a controller coupled to the plurality of metasurface antenna tiles to dynamically configure the plurality of metasurface antenna tiles to generate different numbers of beams with one or more frequencies among the beams.

15. An antenna architecture comprising:
a plurality of metasurface antenna tiles, each metasurface antenna tile of the plurality of metasurface antenna tiles having one or more feed ports configured to be individually fed to support one or more independent beams, wherein the plurality of metasurface antenna tiles is configurable into a plurality of sub-arrays of metasurface antenna tiles to produce multiple simultaneous beams from one or more individual metasurface antenna tiles or from different sub-arrays of the plurality of sub-arrays;
a plurality of digital back ends (DBEs) coupled to the plurality of metasurface antenna tiles, wherein each DBE of the plurality DBEs is coupled to one sub-array of the plurality of sub-arrays of metasurface antenna tiles to:
adjust time delays of one or more of received signals arriving from metasurface antenna tiles of the one sub-array of metasurface antenna tiles as part of time delay beamforming and combine the received signals in a digital domain to produce one or more beamformed signals, and
delay transmit signals fed to the plurality of tiles in the digital domain by adjusting time delays of one or more of the transmit signals as part of time delay beamforming,
wherein the time delays applied to received and transmit signals compensate for differences in receive and transmit paths, respectively, and in feed delays for each of the plurality of metasurface antenna tiles, the feed delays being a function of geometry of each sub-array of the plurality of sub-arrays and spacing between the plurality of sub-arrays.

16. The antenna architecture of claim 15 wherein the time delays are generated by self-calibration.

17. The antenna architecture of claim 15 wherein each of the plurality of DBEs comprises a true time delay (TTD) digital beamformer to perform the time delay beamforming in the digital domain.

18. The antenna architecture of claim 17 wherein each of the metasurface antenna tiles comprises a power detector coupled to the TTD digital beamformer to send a portion of a signal from a front end of said each metasurface antenna tile to the TTD digital beamformer.

19. The antenna architecture of claim 15 further comprising:
a time counter to receive signals from power detectors of the plurality of metasurface antenna tiles and compute a time delay between different the power detector signals;
a delay estimation unit to compute the time delay between signals from different metasurface antenna tiles of the plurality of metasurface antenna tiles based on scan angle, tile size, tile location, and time calibration data from the time counter; and
a plurality of digital delays coupled to the delay estimation unit to apply delays in the digital domain to one or more of the signals based on output from the delay estimation unit.

20. The antenna architecture of claim 15 wherein the plurality of metasurface antenna tiles are dynamically configurable to generate different numbers of beams at multiple frequencies.

* * * * *